(12) United States Patent
Toyama

(10) Patent No.: US 9,075,224 B2
(45) Date of Patent: Jul. 7, 2015

(54) ZOOM LENS AND IMAGING APPARATUS

(71) Applicant: FUJIFILM Corporation, Tokyo (JP)

(72) Inventor: Nobuaki Toyama, Saitama-ken (JP)

(73) Assignee: FUJIFILM CORPORATION, Tokyo (JP)

(*) Notice: Subject to any disclaimer, the term of this patent is extended or adjusted under 35 U.S.C. 154(b) by 0 days.

(21) Appl. No.: 14/148,106

(22) Filed: Jan. 6, 2014

(65) Prior Publication Data

US 2014/0118841 A1 May 1, 2014

Related U.S. Application Data

(63) Continuation of application No. PCT/JP2012/004330, filed on Jul. 4, 2012.

(30) Foreign Application Priority Data

Jul. 15, 2011 (JP) .................................. 2011-156391

(51) Int. Cl.
- G02B 15/00 (2006.01)
- G02B 15/22 (2006.01)
- G02B 15/17 (2006.01)

(52) U.S. Cl.
CPC ................ *G02B 15/22* (2013.01); *G02B 15/00* (2013.01); *G02B 15/17* (2013.01)

(58) Field of Classification Search
CPC ........ G02B 15/00; G02B 15/22; G02B 15/24; G02B 15/26
USPC .................................................. 359/688, 686
See application file for complete search history.

(56) References Cited

U.S. PATENT DOCUMENTS

| | | | | |
|---|---|---|---|---|
| 5,499,141 A | * | 3/1996 | Ohtake | 359/684 |
| 5,889,619 A | * | 3/1999 | Ozaki et al. | 359/688 |
| 6,215,599 B1 | * | 4/2001 | Ohtake | 359/688 |
| 2007/0058264 A1 | | 3/2007 | Yakita | |
| 2009/0034097 A1 | | 2/2009 | Yakita | |
| 2011/0038056 A1 | * | 2/2011 | Nakamura | 359/688 |

FOREIGN PATENT DOCUMENTS

| | | |
|---|---|---|
| JP | 63-204216 | 8/1988 |
| JP | 04-055808 | 2/1992 |
| JP | 07-063992 | 3/1995 |

(Continued)

OTHER PUBLICATIONS

International Search Report, PCT/2012/004330, Nov. 6, 2012.

Primary Examiner — Scott J Sugarman
Assistant Examiner — William R Alexander
(74) Attorney, Agent, or Firm — Young & Thompson

(57) ABSTRACT

A zoom lens substantially consists of, in order from the object side: a first lens group that has a positive refractive power and is fixed during magnification change; a second lens group that has a negative refractive power and is moved along the optical axis during magnification change; a third lens group that has a negative refractive power and corrects for fluctuation of the image plane along with magnification change; and a fourth lens group that has a positive refractive power and is fixed during magnification change. Focusing of an object at a distance between infinity and a predetermined distance is achieved by moving a first-group second lens sub-group, which is a part of the first lens group, along the optical axis, and focusing of an object at a closer distance than the predetermined distance is achieved by moving the third lens group along the optical axis.

3 Claims, 17 Drawing Sheets

(56) References Cited

FOREIGN PATENT DOCUMENTS

| JP | 08-005920 | 1/1996 |
| JP | 09-258102 | 10/1997 |
| JP | 10-206738 | 8/1998 |
| JP | 2007-078833 | 3/2007 |
| JP | 2009-036844 | 2/2009 |
| JP | 2011-039400 | 2/2011 |

* cited by examiner

FIG.2 EXAMPLE 1 (×2)

FIG.4 EXAMPLE 2 (×2)

EXAMPLE 3 (×2)

EXAMPLE 4 (×2)

FIG.9
EXAMPLE 1 (×1)
WIDE-ANGLE END
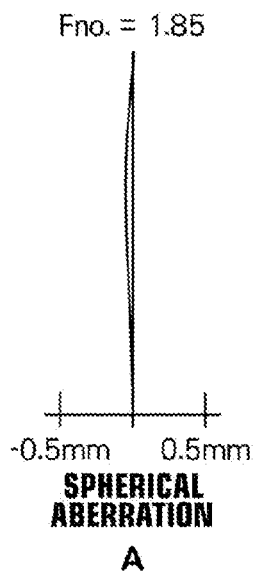
A
SPHERICAL ABERRATION
Fno. = 1.85
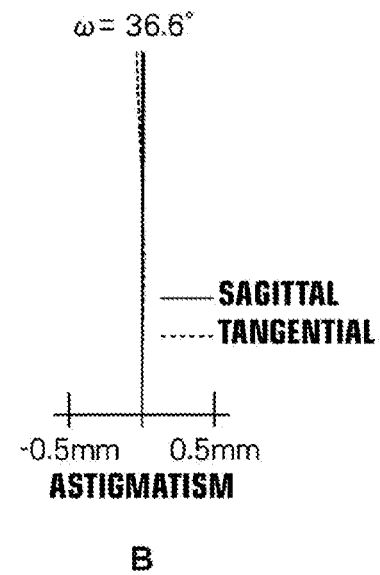
B
ASTIGMATISM
ω = 36.6°
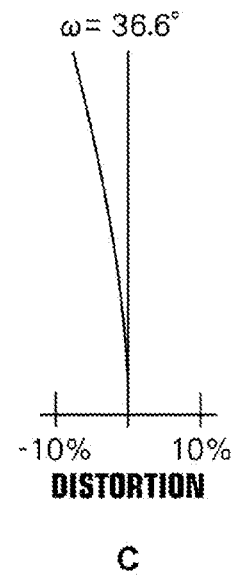
C
DISTORTION
ω = 36.6°
TELEPHOTO END
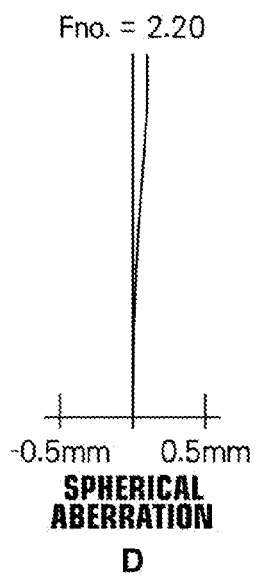
D
SPHERICAL ABERRATION
Fno. = 2.20
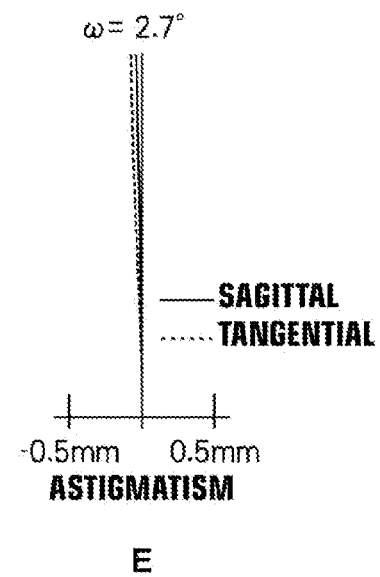
E
ASTIGMATISM
ω = 2.7°
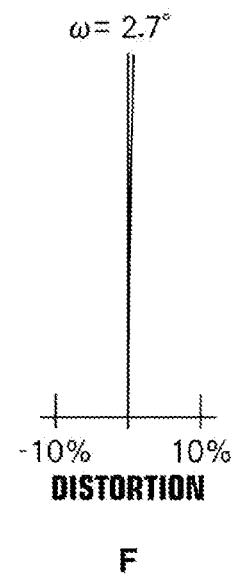
F
DISTORTION
ω = 2.7°

FIG.10
EXAMPLE 1 (×2)
WIDE-ANGLE END
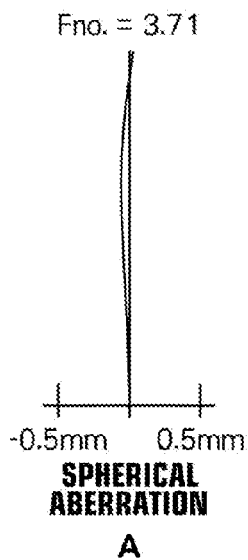
Fno. = 3.71
-0.5mm  0.5mm
SPHERICAL ABERRATION
A
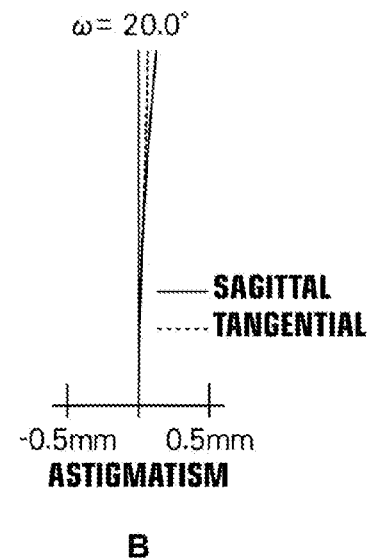
ω = 20.0°
—— SAGITTAL
------ TANGENTIAL
-0.5mm  0.5mm
ASTIGMATISM
B
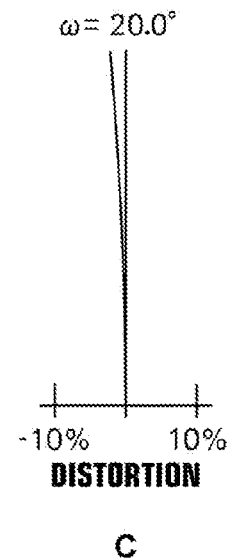
ω = 20.0°
-10%  10%
DISTORTION
C
TELEPHOTO END
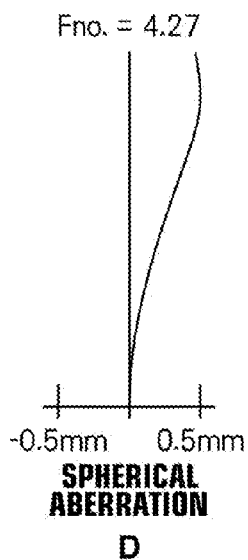
Fno. = 4.27
-0.5mm  0.5mm
SPHERICAL ABERRATION
D
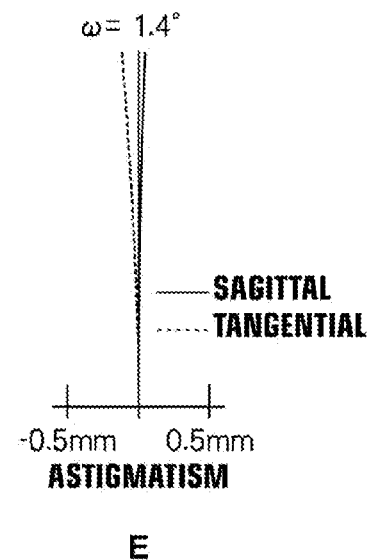
ω = 1.4°
—— SAGITTAL
------ TANGENTIAL
-0.5mm  0.5mm
ASTIGMATISM
E
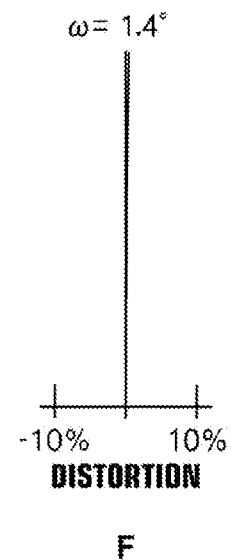
ω = 1.4°
-10%  10%
DISTORTION
F

FIG.11
EXAMPLE 2 (×1)
WIDE-ANGLE END
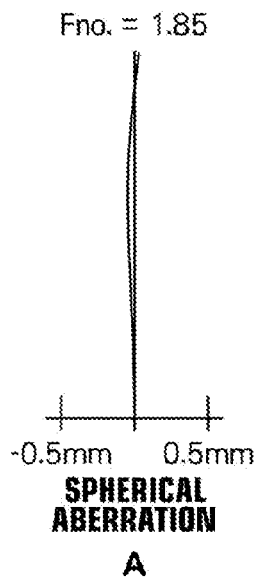
A
SPHERICAL ABERRATION
Fno. = 1.85
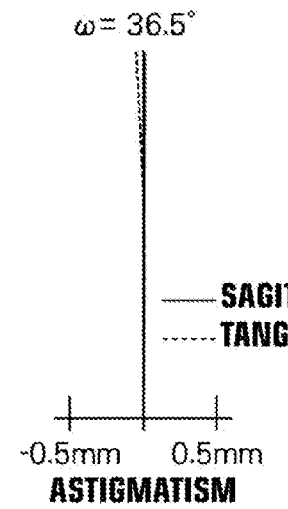
B
ASTIGMATISM
ω = 36.5°
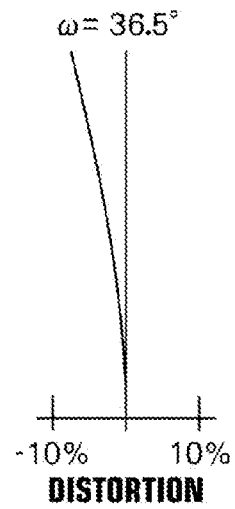
C
DISTORTION
ω = 36.5°
TELEPHOTO END
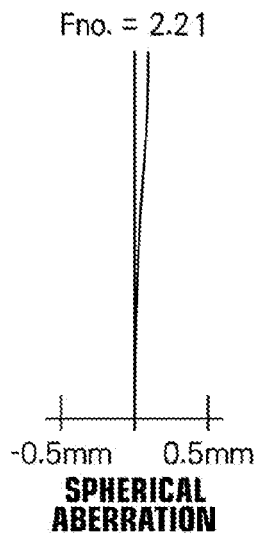
D
SPHERICAL ABERRATION
Fno. = 2.21
E
ASTIGMATISM
ω = 2.7°
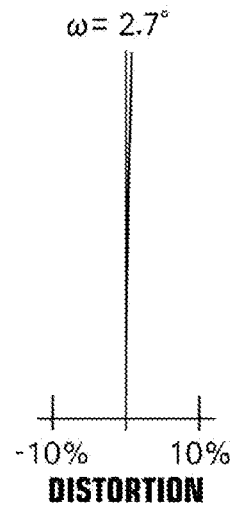
F
DISTORTION
ω = 2.7°

FIG.12
EXAMPLE 2 (×2)
WIDE-ANGLE END
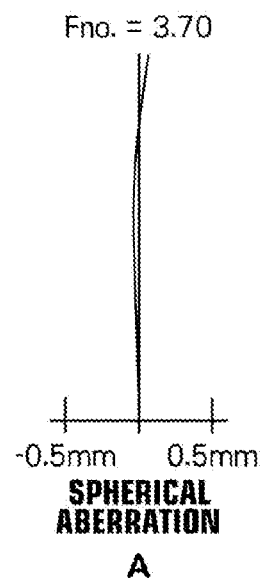
A
Fno. = 3.70
SPHERICAL ABERRATION
-0.5mm  0.5mm
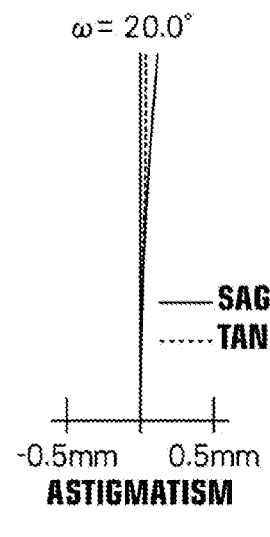
B
ω = 20.0°
SAGITTAL
TANGENTIAL
ASTIGMATISM
-0.5mm  0.5mm
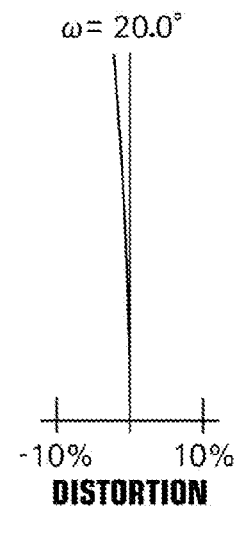
C
ω = 20.0°
DISTORTION
-10%  10%
TELEPHOTO END
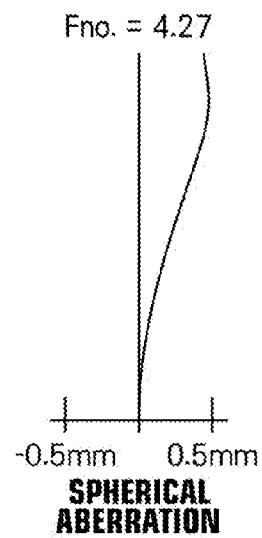
D
Fno. = 4.27
SPHERICAL ABERRATION
-0.5mm  0.5mm
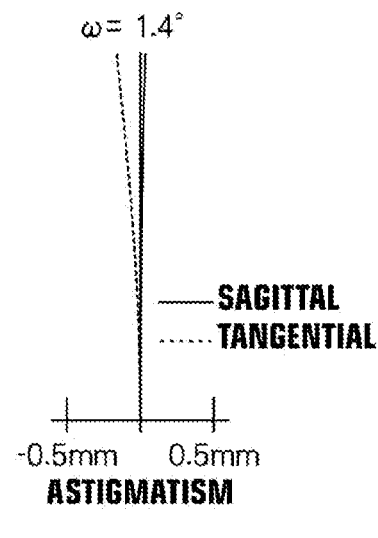
E
ω = 1.4°
SAGITTAL
TANGENTIAL
ASTIGMATISM
-0.5mm  0.5mm
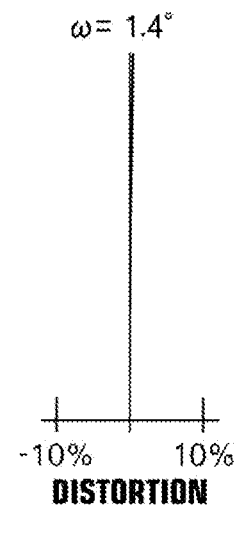
F
ω = 1.4°
DISTORTION
-10%  10%

FIG.13
EXAMPLE 3 (×1)
WIDE-ANGLE END
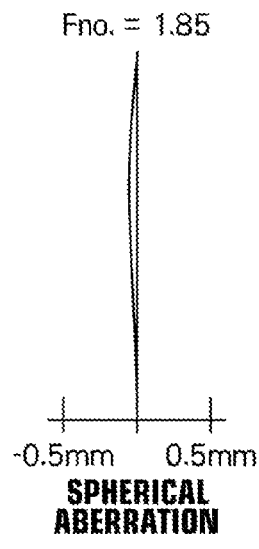
A
SPHERICAL ABERRATION
Fno. = 1.85
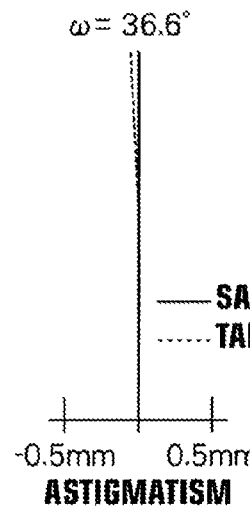
B
ASTIGMATISM
ω = 36.6°
— SAGITTAL
····· TANGENTIAL
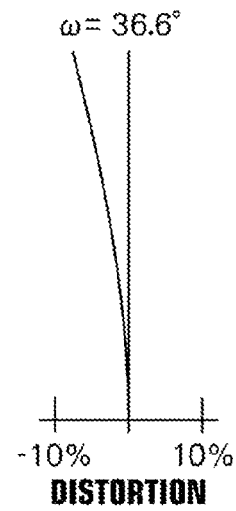
C
DISTORTION
ω = 36.6°
TELEPHOTO END
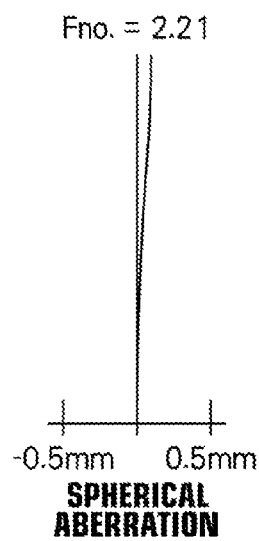
D
SPHERICAL ABERRATION
Fno. = 2.21
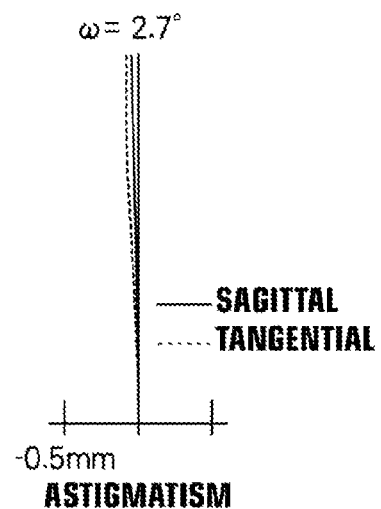
E
ASTIGMATISM
ω = 2.7°
— SAGITTAL
····· TANGENTIAL
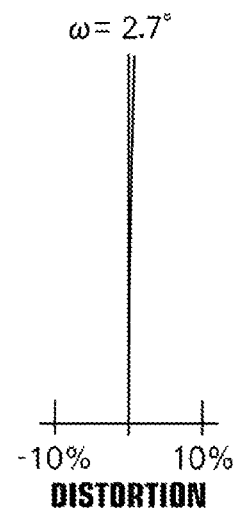
F
DISTORTION
ω = 2.7°

FIG.14
EXAMPLE 3 (×2)
WIDE-ANGLE END
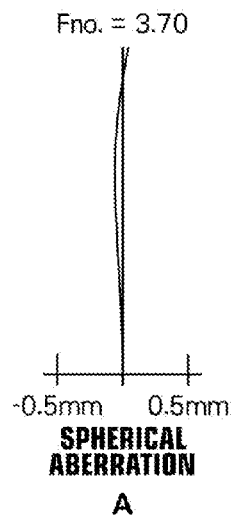
Fno. = 3.70
-0.5mm 0.5mm
SPHERICAL ABERRATION
A
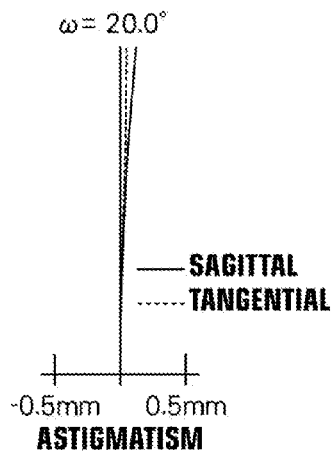
ω = 20.0°
—— SAGITTAL
------ TANGENTIAL
-0.5mm 0.5mm
ASTIGMATISM
B
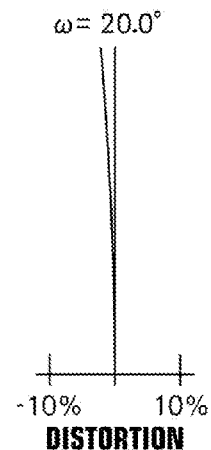
ω = 20.0°
-10% 10%
DISTORTION
C
TELEPHOTO END
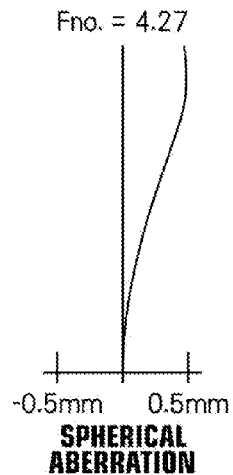
Fno. = 4.27
-0.5mm 0.5mm
SPHERICAL ABERRATION
D
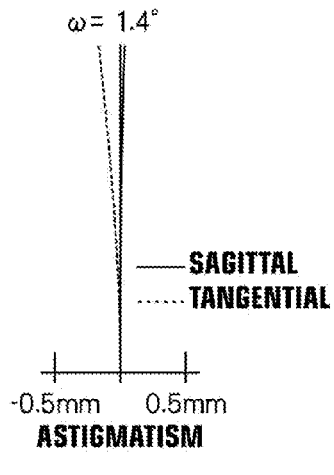
ω = 1.4°
—— SAGITTAL
------ TANGENTIAL
-0.5mm 0.5mm
ASTIGMATISM
E
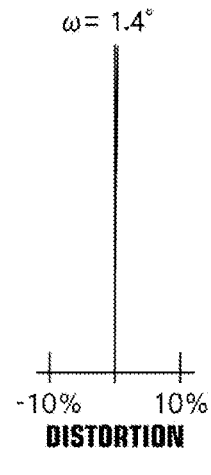
ω = 1.4°
-10% 10%
DISTORTION
F

FIG.15
EXAMPLE 4 (×1)
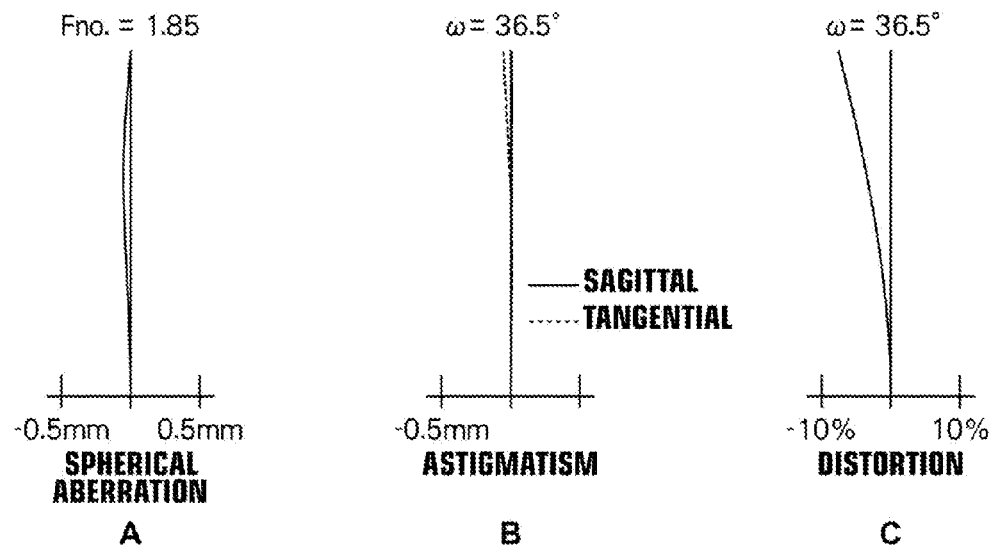
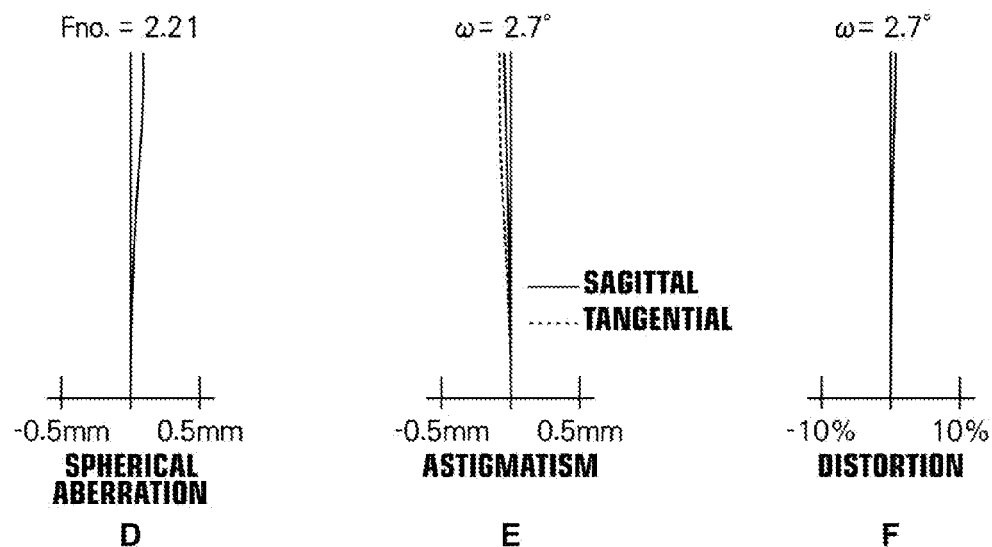

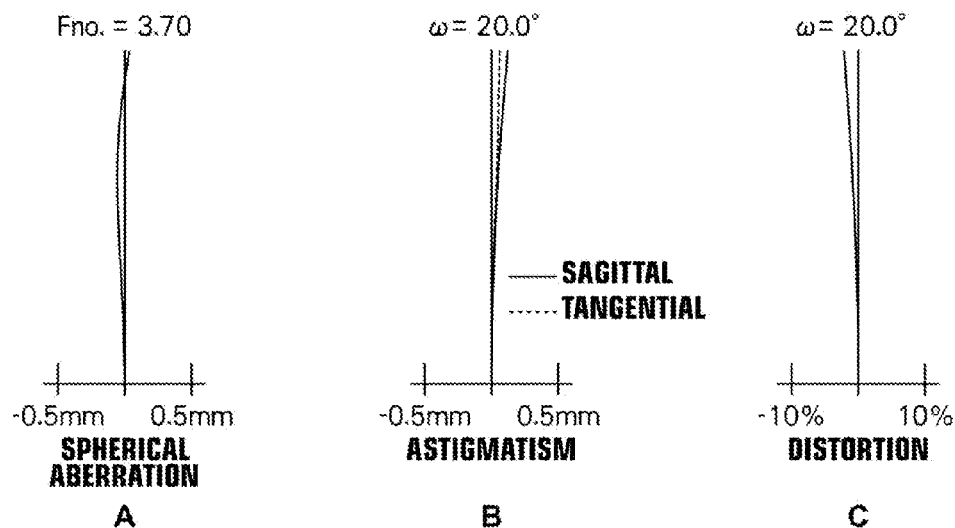
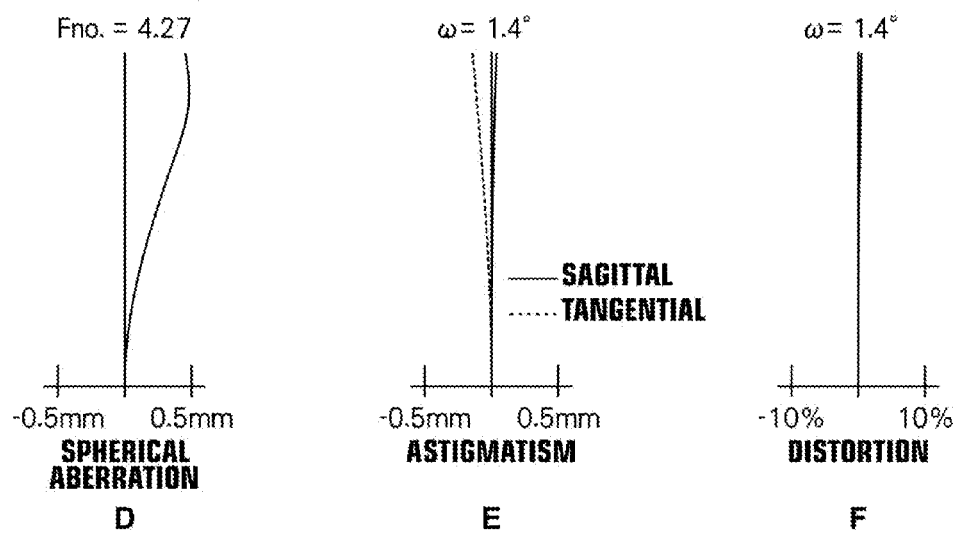
FIG.16

ZOOM LENS AND IMAGING APPARATUS

CROSS REFERENCE TO RELATED APPLICATIONS

This application is a continuation of Application No. PCT/JP2012/004300 filed on Jul. 4, 2012, which claims foreign priority to Japanese Application No. 2011-156391 filed on Jul. 15, 2011. The entire contents of each of the above applications are hereby incorporated by reference.

TECHNICAL FIELD

The present invention relates to a zoom lens and an imaging apparatus, and in particular to a zoom lens that allows closer range imaging than conventional, and an imaging apparatus provided with the zoom lens.

BACKGROUND ART

Conventionally, as a zoom lens capable of close-range imaging that is preferably mounted on a television camera, etc., one disclosed in Japanese Unexamined Patent Publication No. 10 (1998)-206738 (hereinafter, Patent Document 1), for example, is known. The zoom lens disclosed in Patent Document 1 has a configuration where focusing in the range between infinity and a predetermined distance is achieved by moving the entire first lens group along the optical axis, and focusing of an object at a closer distance than the predetermined distance is achieved by moving the most image-side lens group (fifth lens group) toward the object side.

DISCLOSURE OF INVENTION

With respect to the zoom lens that is provided with the close-range imaging capability in the manner as described above, it is also contemplated to form the most image-side lens group by two lens sub-groups so that another lens sub-group (a so-called extender) can be removably inserted therebetween to shift the focal length of the entire system toward the long-focus side to allow zoom-in imaging.

In the case where such a configuration is employed, it is difficult to ensure a space for inserting the extender with the configuration as shown in Patent Document 1 where focusing is achieved by moving the most image-side lens group toward the object side. Further, if a large interval is set between the lens sub-groups in front of and behind the extender to ensure the space, the position of the exit pupil is close to the image plane, resulting in higher tendency of color shading problem, etc.

Further, newly adding a mechanism for moving the most image-side lens sub-group to allow closer-range imaging leads to cost increase of the zoom lens.

In view of the above-described circumstances, the present invention is directed to providing a zoom lens that is capable of close-range imaging, can be formed at lower costs, and has no difficulty in ensuring a space for inserting an extender.

The present invention is also directed to providing an imaging apparatus that is provided with the above-described zoom lens and is capable of closer range imaging than conventional.

The zoom lens according to the invention is a zoom lens substantially consisting of, in order from an object side: a first lens group that has a positive refractive power and is fixed during magnification change; a second lens group that has a negative refractive power and is moved along an optical axis during magnification change; a third lens group that has a negative refractive power and corrects for fluctuation of an image plane along with magnification change; and a fourth lens group that has a positive refractive power and is fixed during magnification change, wherein focusing of an object at a distance between infinity and a predetermined distance is achieved by moving the entire first lens group or a part of the first lens group along the optical axis, and focusing of an object at a closer distance than the predetermined distance is achieved by moving the third lens group along the optical axis.

The description "substantially consisting of a first lens group, a second lens group, a third lens group, and a fourth lens group" as used herein means that the zoom lens may include, besides these lens groups, lenses substantially without any power, optical elements other than lenses, such as stops and glass covers, and mechanical components, such as lens flanges, lens barrels, imaging elements, and camera shake correcting mechanisms. The same applies to the similar descriptions, namely, "the first lens group substantially consists of a first-group first lens sub-group and a first-group second lens sub-group" and "the fourth lens group substantially consists of a fourth-group first lens sub-group, a fourth-group second lens sub-group, and a fourth-group third lens sub-group", which will appear later.

It is more preferable that the zoom lens according to the invention is configured such that focusing of an object at a distance between infinity and the predetermined distance is achieved by moving a part of the first lens group along the optical axis.

In the case where the above configuration is employed, it is desirable that the zoom lens of the invention is configured such that the first lens group substantially consists of, in order from the object side, a first-group first lens sub-group and a first-group second lens sub-group, and focusing of an object at a distance between infinity and the predetermined distance is achieved by moving the first-group second lens sub-group along the optical axis.

In the zoom lens of the invention, it is desirable that the fourth lens group substantially consists of: a fourth-group first lens sub-group that has a positive refractive power; a fourth-group second lens sub-group that is disposed on an image side of the fourth-group first lens sub-group and has a positive refractive power; and a fourth-group third lens sub-group that is removably insertable between the fourth-group second lens sub-group and the fourth-group first lens sub-group, wherein when the fourth-group third lens sub-group is inserted, a focal length of the entire zoom lens is shifted toward a long-focus side. It should be noted that the fourth-group third lens sub-group serves as the previously-mentioned extender.

It is desirable that the zoom lens of the invention satisfies the conditional expression below:

$$-0.8 < f3/ft < -0.2 \quad (1),$$

where f3 is a focal length of the third lens group, and ft is a focal length of the entire system at a telephoto end.

Further, it is desirable that the zoom lens of the invention satisfies the conditional expression below:

$$0.01 < k3/ft < 0.08 \quad (2),$$

where k3 is an amount of movement of the third lens group to achieve focusing in the range between the predetermined distance and a minimum object distance at a telephoto end, and ft is a focal length of the entire system at the telephoto end.

On the other hand, the imaging apparatus according to the invention includes the above-described zoom lens according to the invention.

The zoom lens of the invention is configured such that focusing of an object at a distance between infinity and a predetermined distance is achieved by moving the entire first lens group or apart of the first lens group along the optical axis, and focusing of an object at a closer distance than the predetermined distance is achieved by moving the third lens group along the optical axis. Utilizing a mechanism for moving the third lens group, which is originally provided for achieving magnification change, to achieve focusing in this manner allows forming the zoom lens at lower costs.

In a case where the entire first lens group or only a part of the first lens group is moved to achieve focusing across the entire range between infinity and the minimum object distance, the entire length, the outer diameter and the mass of the zoom lens are increased, and aberration is increased over the range between infinity and a very close distance, leading to degradation of performance. In contrast, the zoom lens of the invention is configured to achieve focusing of an object at a closer distance than the predetermined distance by moving the third lens group. This allows shortening the minimum object distance without increasing the entire length, the outer diameter and the mass of the zoom lens. Further, in a case where a so-called electronic cam structure is applied to the third lens group, control of both the zooming and the focusing is facilitated.

Further, moving the third lens group to achieve the focusing of an object at a closer distance than the predetermined distance eliminates necessity of providing a large interval between the lens sub-groups in front of and behind the extender even when the extender is disposed in the fourth lens group, thereby preventing the above-mentioned color shading problem, etc.

Further, particularly in the case where the zoom lens according to the invention is configured to achieve focusing of an object at a distance between infinity and the predetermined distance by moving a part of the first lens group along the optical axis, a compact and light-weight mechanism for moving the part of the first lens group can be applied, thereby achieving size reduction and weight reduction of the zoom lens.

In this case, particularly when the first lens group substantially consists of, in order from the object side, a first-group first lens sub-group and a first-group second lens sub-group, and focusing of an object at a distance between infinity and the predetermined distance is achieved by moving the first-group second lens sub-group along the optical axis, it is not necessary to rotate and move the first-group first lens sub-group disposed at the most object-side position, and therefore good operability can be maintained even when a hood, a polarizing filter, or the like, is mounted there.

Further, in the zoom lens of the invention, particularly in the case where the fourth lens group substantially consists of: a fourth-group first lens sub-group that has a positive refractive power; a fourth-group second lens sub-group that is disposed on an image side of the fourth-group first lens sub-group and has a positive refractive power; and a fourth-group third lens sub-group that is removably insertable between the fourth-group second lens sub-group and the fourth-group first lens sub-group, wherein when the fourth-group third lens sub-group is inserted, a focal length of the entire zoom lens is shifted toward a long-focus side, the function of the fourth-group third lens sub-group as the extender allows forming and imaging a more magnified image. With this configuration, the fourth-group second lens sub-group is not moved for focusing, and this facilitates ensuring a space for inserting the fourth-group third lens sub-group.

Further, particularly in the case where the zoom lens of the invention satisfies the conditional expression (1), the following effect is obtained. Namely, if the value of f3/ft is not greater than the lower limit of the conditional expression (1), fluctuation of spherical aberration along with magnification change increases. On the other hand, if the value of f3/ft is not smaller than the upper limit of the conditional expression (1), fluctuation of astigmatism along with magnification change increases. Such problems can be prevented when the conditional expression (1) is satisfied.

Further, particularly in the case where the zoom lens of the invention satisfies the conditional expression (2), the following effect is obtained. Namely, if the value of k3/ft is not greater than the lower limit of the conditional expression (2), the amount of movement of the third lens group is decreased and it is difficult to sufficiently shorten the minimum object distance. On the other hand, if the value of k3/ft is not smaller than the upper limit of the conditional expression (2), the amount of movement of the third lens group is increased, leading to a low zoom ratio. Such problems can be prevented when the conditional expression (2) is satisfied.

On the other hand, the imaging apparatus according to the invention that is provided with the zoom lens of the invention having the above-described effects can sufficiently image an object at a close distance, and can be made compact and light weight.

BRIEF DESCRIPTION OF THE DRAWINGS

FIG. 9 shows, at A to F, aberration diagrams of the zoom lens according to Example 1 of the invention when the extender is not inserted, FIG. 10 shows, at A to F, aberration diagrams of the zoom lens according to Example 1 of the invention when the extender is inserted, FIG. 11 shows, at A to F, aberration diagrams of the zoom lens according to Example 2 of the invention when the extender is not inserted, FIG. 12 shows, at A to F, aberration diagrams of the zoom lens according to Example 2 of the invention when the extender is inserted, FIG. 13 shows, at A to F, aberration diagrams of the zoom lens according to Example 3 of the invention when the extender is not inserted, FIG. 14 shows, at A to F, aberration diagrams of the zoom lens according to Example 3 of the invention when the extender is inserted, FIG. 15 shows, at A to F, aberration diagrams of the zoom lens according to Example 4 of the invention when the extender is not inserted, FIG. 16 shows, at A to F, aberration diagrams of the zoom lens according to Example 4 of the invention when the extender is inserted.

DESCRIPTION OF PREFERRED EMBODIMENTS

Figure 1:
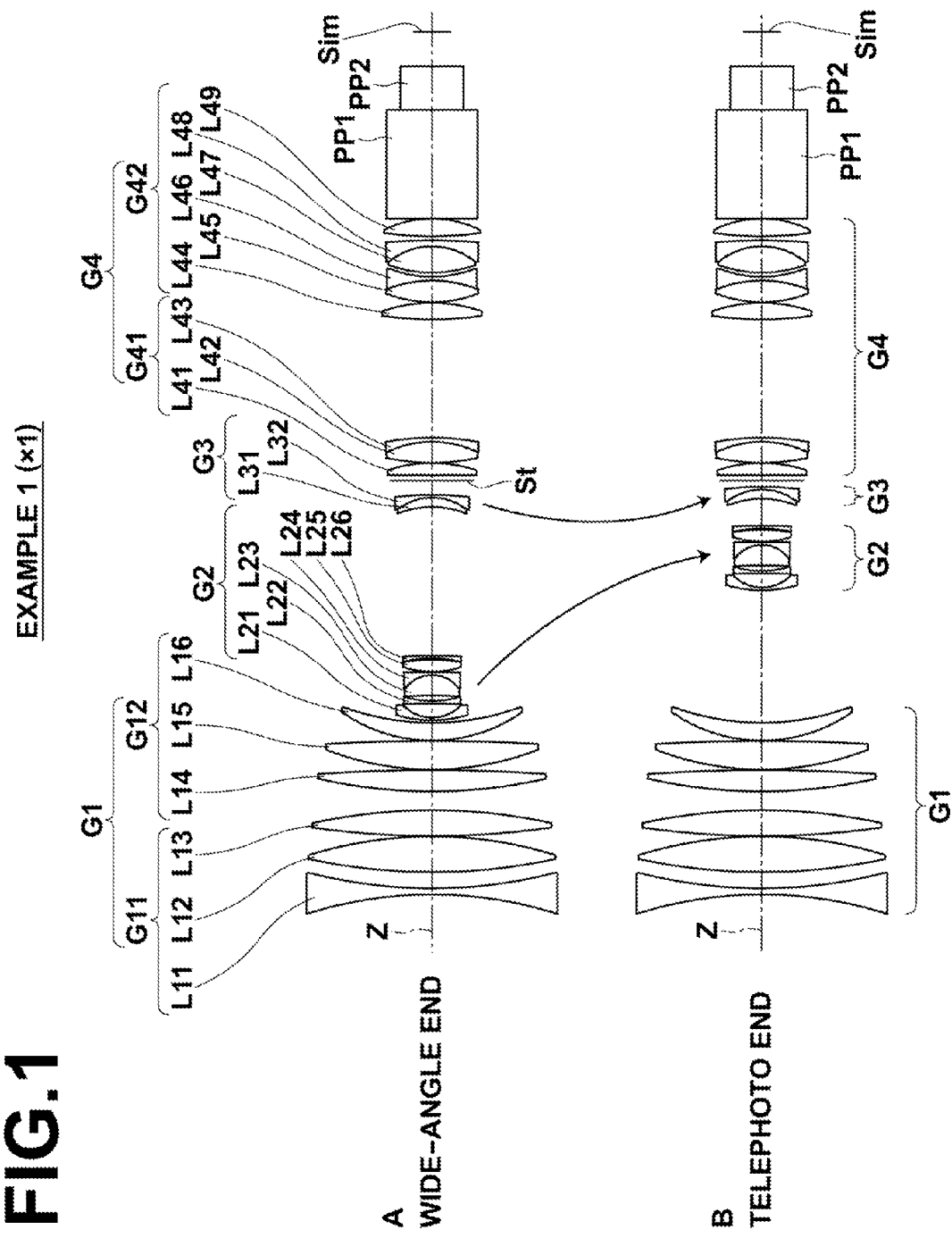
FIG. 1 is a sectional view illustrating the lens configuration of a zoom lens according to Example 1 of the invention when an extender is not inserted.
Figure 2:
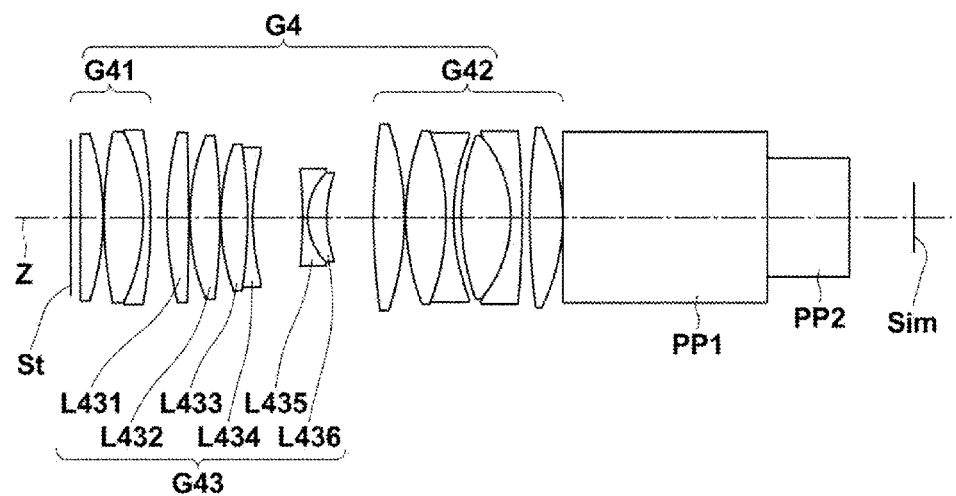
FIG. 2 is a sectional view showing a part of the zoom lens of FIG. 1 in a state where an extender is inserted.
Figure 3:
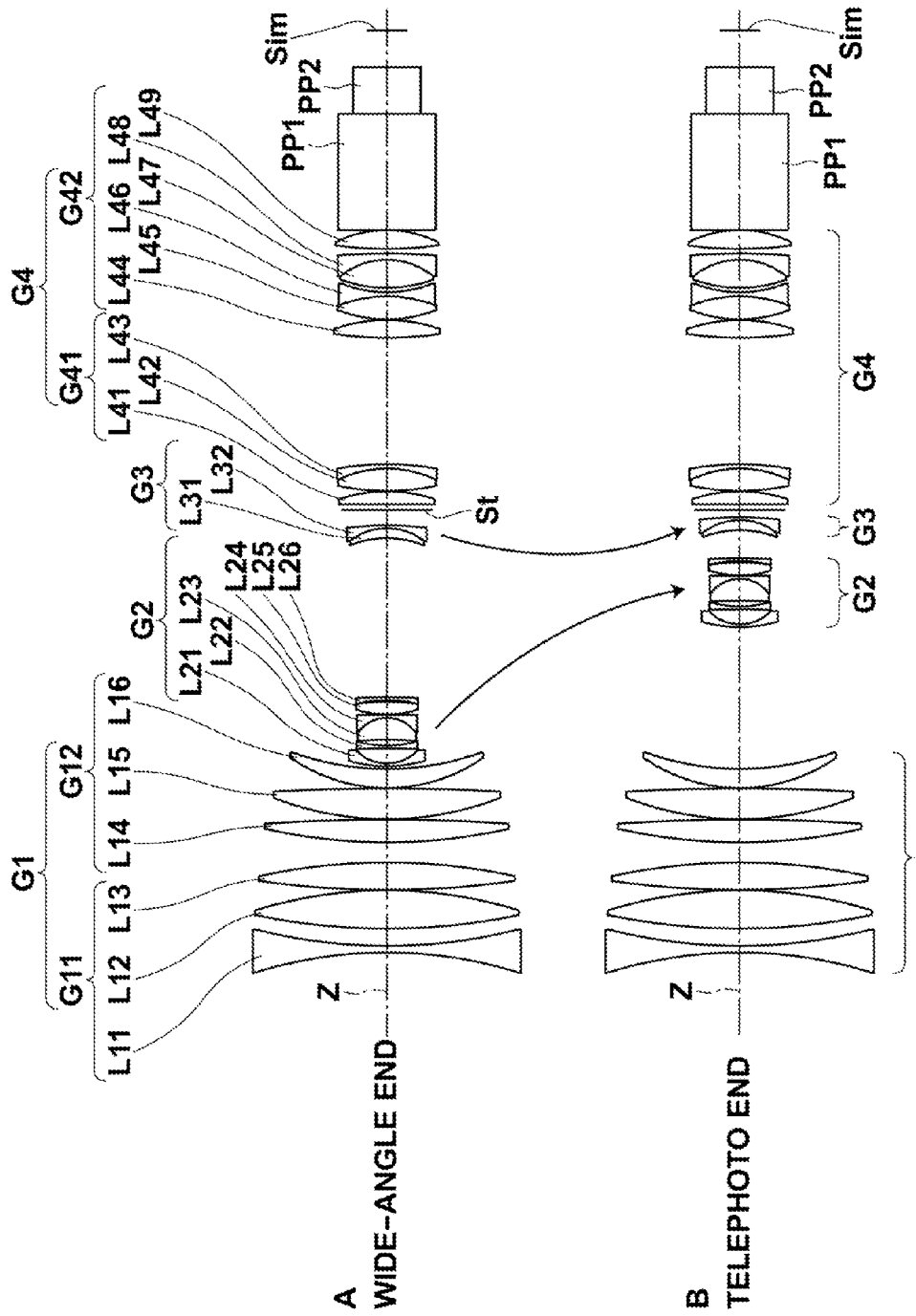
FIG. 3 is a sectional view illustrating the lens configuration of a zoom lens according to Example 2 of the invention when an extender is not inserted.
Figure 4:
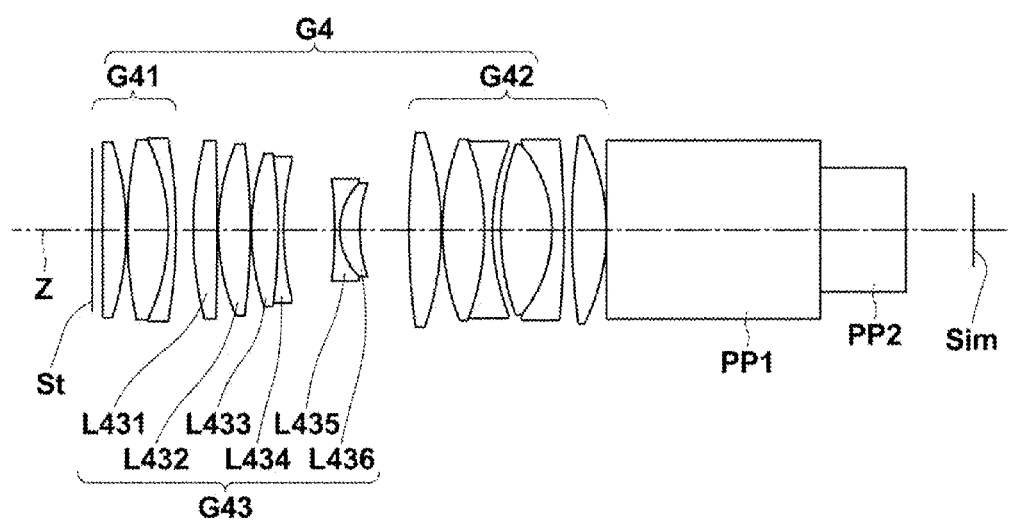
FIG. 4 is a sectional view showing a part of the zoom lens of FIG. 3 in a state where an extender is inserted.
Figure 5:
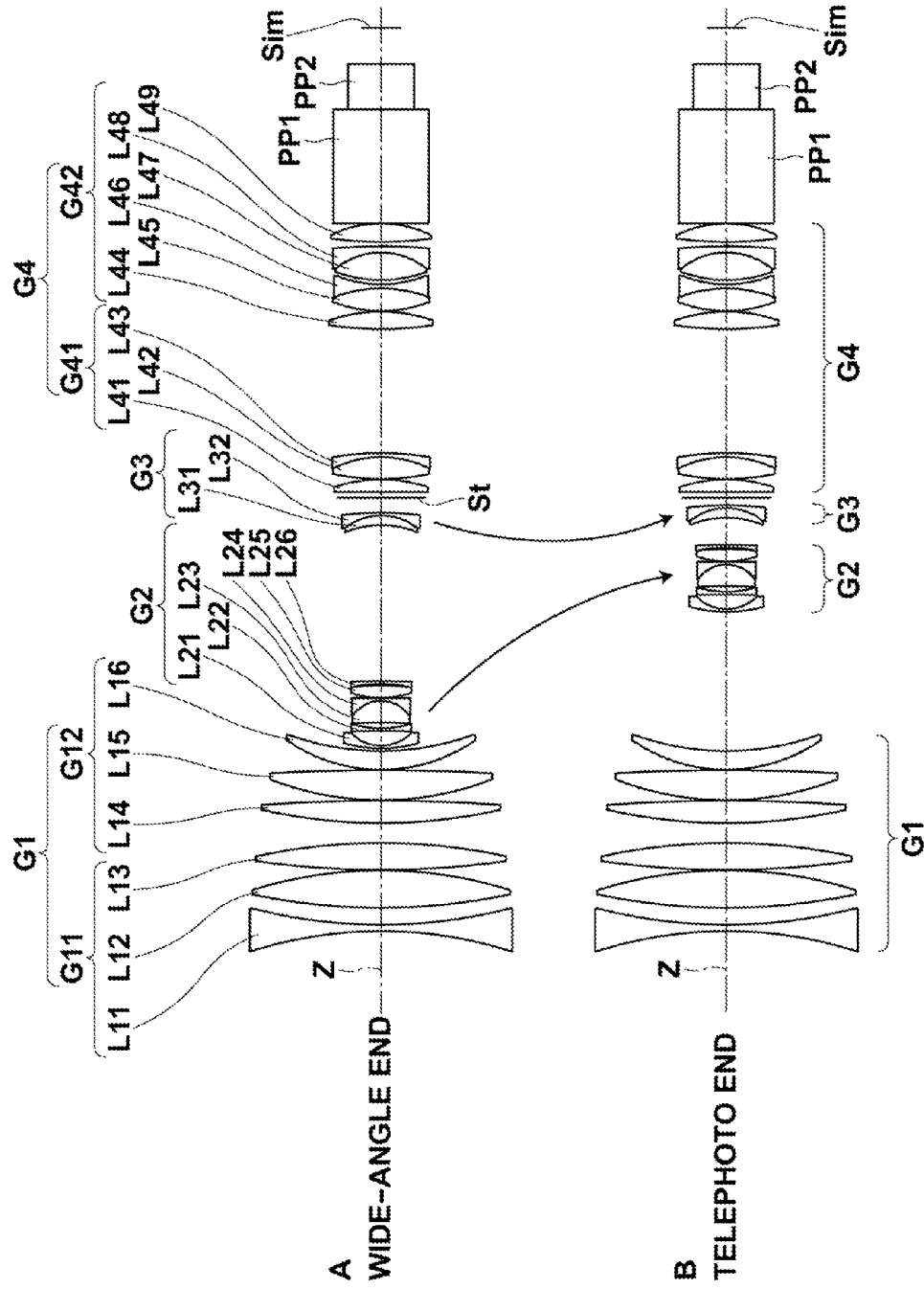
FIG. 5 is a sectional view illustrating the lens configuration of a zoom lens according to Example 3 of the invention when an extender is not inserted.
Figure 6:
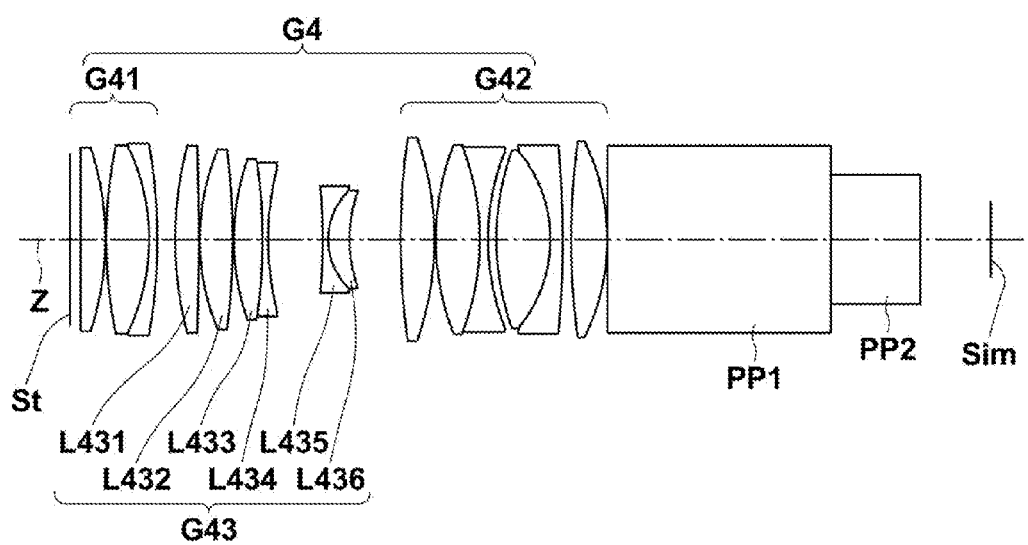
FIG. 6 is a sectional view showing a part of the zoom lens of FIG. 5 in a state where an extender is inserted.
Figure 7:
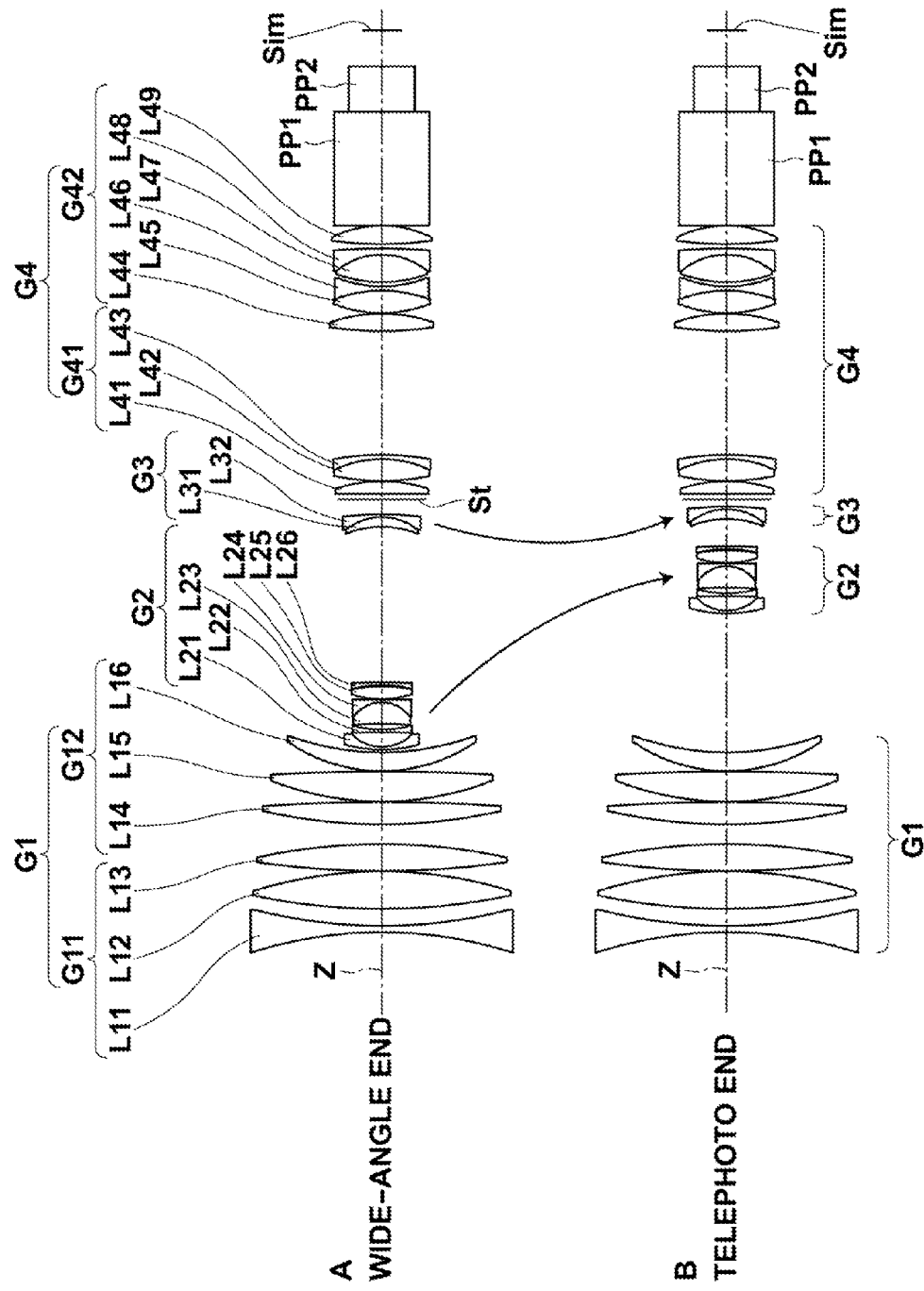
FIG. 7 is a sectional view illustrating the lens configuration of a zoom lens according to Example 4 of the invention when an extender is not inserted.
Figure 8:
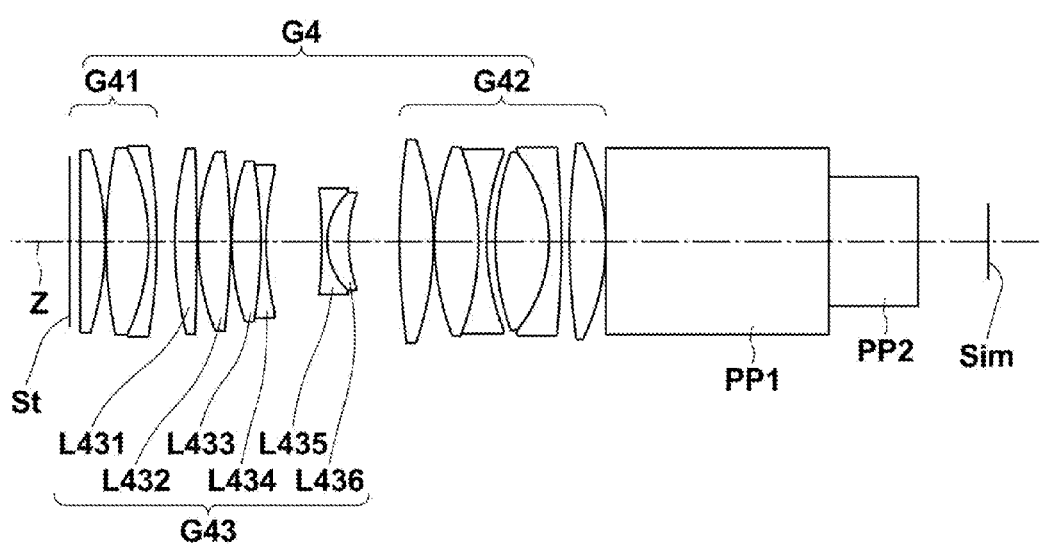
FIG. 8 is a sectional view showing a part of the zoom lens of FIG. 7 in a state where an extender is inserted.

Hereinafter, an embodiment of the present invention will be described in detail with reference to the drawings. FIG. 1 is a sectional view illustrating a configuration example of a zoom lens according to an embodiment of the invention, and corresponds to a zoom lens of Example 1, which will be described later. It should be noted that FIG. 1 shows a state where a fourth-group third lens sub-group G43 serving as an extender, which will be described later, is not inserted, and FIG. 2 shows a state where the fourth-group third lens sub-group G43 is inserted. The former state shown in FIG. 1 is indicated by "(x1)" in the drawing, and the latter state shown in FIG. 2 is indicated by "(x2)" in the drawing. The same applies to the other drawings and tables.

FIGS. 3 and 4, FIGS. 5 and 6, and FIGS. 7 and 8 are sectional views illustrating the other configuration examples according to the embodiment of the invention, similarly to FIGS. 1 and 2, and correspond to zoom lenses of Examples 2, 3 and 4, respectively, which will be described later. The examples shown in FIGS. 3 to 8 have the same basic configuration as that of the example shown in FIGS. 1 and 2 and are shown in the drawings in the same manner. Therefore, the zoom lens according to the embodiment of the invention is described mainly with reference to FIG. 1.

In FIG. 1, the left side is referred to as "object side" and the right side is referred to as "image side". An arrangement of the optical system in the infinity focus state and at the wide-angle end (the shortest focal length state) is shown at A in FIG. 1, and an arrangement of the optical system in the infinity focus state and at the telephoto end (the longest focal length state) is shown at B in FIG. 1. The same applies to FIGS. 3, 5 and 7, which will be described later. FIG. 2 partially shows a state where the fourth-group third lens sub-group G43 is inserted in a fourth lens group G4 that is fixed during magnification change. The same applies to FIGS. 4, 6 and 8.

Lens groups forming the zoom lens according to the embodiment of the invention consists of, in order from the object side, a first lens group G1 having a positive refractive power, a second lens group G2 having a negative refractive power, a third lens group G3 having a negative refractive power and the fourth lens group G4 having a positive refractive power. The fourth lens group G4 includes an aperture stop St. The aperture stop St shown does not necessarily represents the size and the shape thereof but represents the position thereof along an optical axis Z.

In the example shown in FIG. 1, parallel plate-like optical members PP1 and PP2 are disposed between the fourth lens group G4 and an image plane Sim. Some of recent imaging apparatuses employ a 3CCD system, where CCDs for individual colors are used to achieve high image quality. In order to accommodate the 3CCD system, a color separation optical system, such as a color separation prism, is inserted between the lens system and the image plane Sim. The optical members PP1 and PP2 are assumed to represent such a color separation optical system. Further, when the zoom lens is applied to an imaging apparatus, it is preferable that a glass cover, filters, such as an infrared cut filter and a low-pass filter, etc., are provided between the optical system and the image plane Sim depending on the configuration of the camera on which the lens is mounted. In this case, the glass cover, the filters, etc., may be disposed at the position of the optical member PP1 or PP2.

When the magnification of this zoom lens is changed from the wide-angle end to the telephoto end, the first lens group G1 and the fourth lens group G4 are fixed, the second lens group G2 is moved along a trajectory convex toward the image plane Sim, and the third lens group G3 is moved along a trajectory convex toward the object side. In FIG. 1, the trajectories of the second lens group G2 and the third lens group G3 when they are moved during magnification change from the wide-angle end to the telephoto end are schematically shown by the arrows in solid lines provided between A and B.

The first lens group G1 includes, in order from the object side, a first-lens-group first lens L11 having a negative refractive power (it should be noted that the first numeric character of the numeric characters following "L" of the reference symbol of each lens indicates the lens group, and therefore the indication "first-lens-group" in the lens name is omitted in the following description (the same applies to lens names of lenses in the second lens group G2 and the following lens groups)), a second lens L12 having a positive refractive power, a third lens L13 having a positive refractive power, a fourth lens L14 having a positive refractive power, a fifth lens L15 having a positive refractive power, and a sixth lens L16 having a positive refractive power. The first lens L11, the second lens L12 and the third lens L13 form a first-group first lens sub-group G11, and the fourth lens L14, the fifth lens L15 and the sixth lens L16 form a first-group second lens sub-group G12, which is moved along the optical axis Z to achieve focusing.

As in the example shown in FIG. 1, for example, the first lens L11 may be a lens having a biconcave shape, the second to fifth lenses L12 to L15 may be lenses having biconvex shapes, and the sixth lens L16 may be a lens having a positive meniscus shape. In this zoom lens, the first to sixth lenses L11 to L16 and all the lenses forming the second lens group G2, the third lens group G3 and the fourth lens group G4, which will be described later, are spherical lenses.

The second lens group G2 includes, in order from the object side, a first lens L21 having a negative refractive power, a second lens L22 having a negative refractive power, a third lens L23 having a positive refractive power, a fourth lens L24 having a negative refractive power, a fifth lens L25 having a positive refractive power, and a sixth lens L26 having a negative refractive power. As in the example shown in FIG. 1, for example, the first lens L21 may be a lens having a negative meniscus shape, the second lens L22 may be a lens having a biconcave shape, the third lens L23 may be a lens having a positive meniscus shape, the fourth lens L24 may be a lens having a negative meniscus shape, the fifth lens L25 may be a lens having a biconvex shape, and the sixth lens L26 may be a lens having a negative meniscus shape.

The third lens group G3 includes, in order from the object side, a first lens L31 having a positive refractive power, and a second lens L32 having a negative refractive power. As in the example shown in FIG. 1, for example, the first lens L31 may be a lens having a positive meniscus shape, and the second lens L32 may be a lens having a negative meniscus shape. The third lens group G3 has a function to correct for fluctuation of the image plane along with magnification change.

The fourth lens group G4 includes, in order from the object side, a first lens L41 having a positive refractive power, a second lens L42 having a positive refractive power, a third lens L43 having a negative refractive power, a fourth lens L44 having a positive refractive power, a fifth lens L45 having a positive refractive power, a sixth lens L46 having a negative refractive power, a seventh lens L47 having a positive refractive power, an eighth lens L48 having a negative refractive power, and a ninth lens L49 having a positive refractive power.

As in the example shown in FIG. 1, for example, the first lens L41 and the second lens L42 may be lenses having biconvex shapes, the third lens L43 may be a lens having a negative meniscus shape, the fourth lens L44 and the fifth lens L45 may be lenses having biconvex shapes, the sixth lens L46 may be a lens having a biconcave shape, the seventh lens L47 may be a lens having a biconvex shape, the eighth lens L48 may be a lens having a negative meniscus shape, and the ninth lens L49 may be a lens having a biconvex shape.

The three lenses including the first lens L41 to the third lens L43 form a fourth-group first lens sub-group G41, and the fourth to ninth lenses L44 to L49 form a fourth-group second lens sub-group G42. The fourth-group first lens sub-group G41 and the fourth-group second lens sub-group G42 are disposed with a relatively large interval therebetween so that the fourth-group third lens sub-group G43 shown in FIG. 2 can be removably inserted therebetween.

As shown in FIG. 2, the fourth-group third lens sub-group G43 includes, in order from the object side, a tenth lens L431 having a positive refractive power, an eleventh lens L432 having a positive refractive power, a twelfth lens L433 having a positive refractive power, a thirteenth lens L434 having a negative refractive power, a fourteenth lens L435 having a negative refractive power, and a fifteenth lens L436 having a positive refractive power.

As in the example shown in FIG. 2, for example, the tenth lens L431, the eleventh lens L432 and the twelfth lens L433 may be lenses having biconvex shapes, the thirteenth lens L434 and the fourteenth lens L435 may be lenses having biconcave shapes, and the fifteenth lens L436 may be a lens having a positive meniscus shape.

The fourth-group third lens sub-group G43 functions as a so-called extender. When the fourth-group third lens sub-group G43 is inserted between the fourth-group first lens sub-group G41 and the fourth-group second lens sub-group G42, the focal length of the entire zoom lens is shifted toward the long-focus side and a more magnified image is formed.

As shown in Table 10, which will be described later, this zoom lens achieves focusing of an object at a distance in the range between infinity and 0.6 m by moving the first-group second lens sub-group G12 along the optical axis Z, and achieves focusing of an object at a distance in the range between 0.6 m and 0.5 m, which is the minimum object distance, by moving the third lens group G3 along the optical axis Z. Utilizing a mechanism for moving the third lens group G3, which is originally provided for achieving magnification change, to achieve focusing in this manner allows forming the zoom lens at lower costs.

In a case where the entire first lens group G1 or only a part of the first lens group G1 is moved to achieve focusing across the entire range between infinity and the minimum object distance, the entire length, the outer diameter and the mass of the zoom lens are increased, and aberration is increased over the range between infinity and a very close distance, leading to degradation of performance. In contrast, the zoom lens of the invention is configured such that focusing of an object at a distance closer than 0.6 m (where the minimum object distance is 0.5 m) is achieved by moving the third lens group G3, as described above. This allows shortening the minimum object distance without increasing the entire length, the outer diameter and the mass of the zoom lens. Further, in a case where a so-called electronic cam structure is applied to the third lens group G3, both the control of zooming and the control of focusing are facilitated.

Further, moving the third lens group G3 to achieve the focusing of an object at a distance between 0.6 m and 0.5 m eliminates necessity of setting a large interval between the fourth-group first lens sub-group G41 and the fourth-group second lens sub-group G42, which is necessary in a case where the fourth-group second lens sub-group G42 is moved forward to achieve focusing, thereby preventing the above-mentioned color shading problem, etc.

Further, this zoom lens is configured such that the focusing of an object at a distance between infinity and 0.6 m is achieved by moving only a part of the first lens group G1, namely the first-group second lens sub-group G12, along the optical axis Z. This allows applying a compact and light-weight mechanism for moving the part of the first lens group G1, thereby achieving size reduction and weight reduction of the zoom lens.

Further, in the case where the focusing is achieved by moving only the first-group second lens sub-group G12, as described above, it is not necessary to rotate and move the first-group first lens sub-group G11 disposed at the most object-side position, and therefore good operability can be maintained even when a hood, a polarizing filter, or the like, is mounted there.

Further, as shown in Table 21 below, this zoom lens satisfies, in particular, the conditional expression (1), and therefore the following effect is obtained. Namely, if the value of f3/ft is not greater than the lower limit of the conditional expression (1), fluctuation of spherical aberration along with magnification change increases. On the other hand, if the value of f3/ft is not smaller than the upper limit of the conditional expression (1), fluctuation of astigmatism along with magnification change increases. Such problems can be prevented when the conditional expression (1) is satisfied.

Further, as shown in Table 21, this zoom lens also satisfies, in particular, the conditional expression (2), and therefore the following effect is obtained. Namely, if the value of k3/ft is not greater than the lower limit of the conditional expression (2), the amount of movement of the third lens group G3 is decreased and it is difficult to sufficiently shorten the minimum object distance. On the other hand, if the value of k3/ft is not smaller than the upper limit of the conditional expression (2), the amount of movement of the third lens group G3 is increased, leading to a low zoom ratio. Such problems can be prevented when the conditional expression (2) is satisfied.

While the optical members PP1 and PP2 representing a color separation prism, etc., are disposed between the lens system and the imaging plane in the example shown in FIG. 1, filters, such as a low-pass filter and a filter that cuts a given wavelength range, may be disposed in place of the color separation prism, etc. Alternatively, such filters may be disposed between the lenses, or coatings having the same functions as such filters may be applied to the lens surfaces of some of the lenses.

Next, numerical examples of the zoom lens of the invention are described. FIGS. 1 to 8 show lens sectional views of zoom lenses of Examples 1 to 4.

Table 1 shows basic lens data of the zoom lens of Example 1 in the case where the fourth-group third lens sub-group G43 is not inserted, and Table 2 shows supplemental basic lens data of the zoom lens of Example 1 in the case where the fourth-group third lens sub-group G43 is inserted. Table 3 shows data relating to zoom of the zoom lens of Example 1 in the case where the fourth-group third lens sub-group G43 is not inserted, and Table 4 shows supplemental data relating to zoom of the zoom lens of Example 1 in the case where the fourth-group third lens sub-group G43 is inserted. Table 5 shows values of amount of movement of the first-group second lens sub-group G12 to achieve focusing in the range between infinity and 0.6 m at the wide-angle end and at the telephoto end, respectively. Table 5 also shows values of amount of movement of the third lens group G3 to achieve focusing in the range between 0.6 m and 0.5 m at the wide-angle end and at the telephoto end, respectively.

Tables 6 to 10 show the similar data, similar to the data shown in Tables 1 to 5, for Example 2, Tables 11 to 15 show the similar data for Example 3, and Table 16 to 20 show the similar data for Example 4.

In the basic lens data shown in Tables 1 and 2, each value in the column of "Si" represents the surface number of the i-th (i=1, 2, 3, . . . ) surface, where the object-side surface of the most object-side element is the 1st surface and the number is sequentially increased toward the image side. Each value in the column of "Ri" represents the radius of curvature of the i-th surface. Each value in the column of "Di" represents the surface interval between the i-th surface and the i+1-th surface along the optical axis Z. It should be noted that the sign with respect to the radius of curvature means that a surface shape that is convex toward the object side is positive and a surface shape that is convex toward the image side is negative.

Further, in the basic lens data, each value in the column of "Ndj" represents the refractive index with respect to the d-line (the wavelength of 587.6 nm) of the j-th (j=1, 2, 3, . . . ) element, where the most object-side element is the 1st element and the number is sequentially increased toward the image side. Each value in the column of "vdj" represents the Abbe number with respect to the d-line of the j-th element. The basic lens data also includes data of the aperture stop St, and the text "∞ (aperture stop)" is shown at the position in the column of the radius of curvature of the surface corresponding to the aperture stop St.

In the basic lens data shown in Table 1, the texts "move 1", "move 2" and "move 3" indicate surface intervals that are changed during the magnification change. The move 1 is the interval between the first lens group G1 and the second lens group G2, the move 2 is the interval between the second lens group G2 and the third lens group G3, and the move 3 is the interval between the third lens group G3 and the fourth lens group G4.

In the data relating to zoom shown in Table 3, values of the focal length (f) of the entire system, the f value (Fno.), the total angle of field (2ω) and the surface intervals that are changed during magnification change at the wide-angle end and at the telephoto end, respectively, are shown.

The numerical values shown in the tables below are rounded at predetermined decimal places. Further, in the data shown in the tables below, the unit of the angle is degrees and the unit of the length is millimeter; however, since optical systems can be used with being proportionally enlarged or reduced, any other suitable units may be used.

TABLE 1

Example 1 Basic lens data (x1)

| Si (Surface number) | Ri (Radius of curvature) | Di (Surface interval) | Ndj (Refractive index) | vdj (Abbe number) |
|---|---|---|---|---|
| 1 | −124.6324 | 1.8500 | 1.806100 | 33.3 |
| 2 | 149.4418 | 4.9082 | | |
| 3 | 179.8203 | 10.8579 | 1.433870 | 95.1 |
| 4 | −125.3837 | 0.1200 | | |
| 5 | 260.0805 | 7.7913 | 1.433870 | 95.1 |
| 6 | −170.5635 | 5.7094 | | |
| 7 | 156.5330 | 6.4671 | 1.433870 | 95.1 |
| 8 | −501.4939 | 0.1200 | | |
| 9 | 88.4491 | 8.7048 | 1.433870 | 95.1 |
| 10 | −574.8478 | 0.1200 | | |
| 11 | 47.7548 | 5.3887 | 1.785396 | 49.5 |
| 12 | 77.8236 | move 1 | | |
| 13 | 38.4303 | 0.8000 | 2.003300 | 28.3 |
| 14 | 12.2584 | 4.2599 | | |
| 15 | −312.9480 | 0.8001 | 1.879980 | 25.9 |
| 16 | 29.6452 | 1.6505 | | |
| 17 | −129.0336 | 6.2590 | 1.808090 | 22.8 |
| 18 | −10.1568 | 0.8171 | 1.830000 | 45.0 |
| 19 | −915.0054 | 0.1415 | | |
| 20 | 28.4017 | 3.6039 | 1.653133 | 33.3 |
| 21 | −61.2964 | 0.4398 | | |
| 22 | −36.6929 | 0.8000 | 1.879993 | 32.9 |
| 23 | −203.6940 | move 2 | | |
| 24 | −27.7467 | 2.8357 | 1.880000 | 21.2 |
| 25 | −16.8994 | 0.8006 | 1.873210 | 40.7 |
| 26 | −94.5739 | move 3 | | |
| 27 | ∞ (aperture stop) | 1.6109 | | |
| 28 | 7610.7188 | 3.6775 | 1.781027 | 49.9 |
| 29 | −43.0912 | 0.1235 | | |
| 30 | 67.9601 | 6.3456 | 1.494884 | 57.7 |
| 31 | −31.7115 | 1.2038 | 1.870616 | 38.9 |
| 32 | −81.0119 | 35.9139 | | |
| 33 | 106.8325 | 5.0108 | 1.574952 | 47.1 |
| 34 | −45.3830 | 0.1898 | | |
| 35 | 38.2574 | 6.5166 | 1.487490 | 70.2 |
| 36 | −38.3400 | 1.2099 | 1.879992 | 34.4 |
| 37 | 35.4456 | 1.2360 | | |
| 38 | 38.3310 | 7.9829 | 1.497000 | 81.6 |
| 39 | −20.6122 | 1.8034 | 1.854831 | 42.5 |
| 40 | −155.6858 | 1.2267 | | |
| 41 | 104.8484 | 5.3750 | 1.578549 | 44.8 |
| 42 | −32.6605 | 0.0000 | | |
| 43 | 0.0000 | 33.0000 | 1.608590 | 46.5 |
| 44 | 0.0000 | 13.2000 | 1.516330 | 64.1 |
| 45 | 0.0000 | | | |
| 46 | 0.0000 | | | |

TABLE 2

Example 1 Basic lens data (x2)

| Si (Surface number) | Ri (Radius of curvature) | Di (Surface interval) | Ndj (Refractive index) | vdj (Abbe number) |
|---|---|---|---|---|
| 28 | 7610.7188 | 3.6775 | 1.781027 | 49.9 |
| 29 | −43.0912 | 0.1235 | | |
| 30 | 67.9601 | 6.3456 | 1.494884 | 57.7 |
| 31 | −31.7115 | 1.2038 | 1.870616 | 38.9 |
| 32 | −81.0119 | 2.6387 | | |
| 101 | 56.2393 | 3.5065 | 1.438750 | 94.9 |
| 102 | −355.1618 | 0.1500 | | |
| 103 | 35.1424 | 4.8762 | 1.438750 | 94.9 |
| 104 | −101.8193 | 0.1500 | | |
| 105 | 35.4803 | 4.3211 | 1.729160 | 54.7 |
| 106 | −75.2018 | 0.8000 | 1.846660 | 23.8 |
| 107 | 42.4034 | 8.0541 | | |
| 108 | −81.9784 | 0.8000 | 1.834810 | 42.7 |
| 109 | 10.2040 | 3.0934 | 1.846660 | 23.9 |
| 110 | 21.1246 | | | |

TABLE 3

Example 1 Data relating to zoom (x1)

| Specifications | Wide-angle end | Telephoto end |
|---|---|---|
| f | 8.02 | 116.36 |
| Fno. | 1.85 | 2.20 |
| 2ω | 73.2 | 5.4 |
| Move 1 | 0.7597 | 40.2031 |
| Move 2 | 45.1429 | 8.1634 |
| Move 3 | 4.3568 | 1.8929 |

TABLE 4

Example 1 Data relating to zoom (x2)

| Specifications | Wide-angle end | Telephoto end |
|---|---|---|
| f | 15.48 | 224.51 |
| Fno. | 3.71 | 4.27 |
| 2ω | 40.0 | 2.8 |

TABLE 5

Example 1 Amount of movement of lens groups

| Distance | Lens group | Wide-angle end | Telephoto end |
|---|---|---|---|
| ∞ to 0.6 m | G12 | 5.291 | 5.291 |
| 0.6 to 0.5 m | G3 | 0.021 | 3.434 |

TABLE 6

Example 2 Basic lens data (x1)

| Si (Surface number) | Ri (Radius of curvature) | Di (Surface interval) | Ndj (Refractive index) | νdj (Abbe number) |
|---|---|---|---|---|
| 1 | −125.1165 | 1.8500 | 1.806100 | 33.3 |
| 2 | 150.5277 | 4.9090 | | |
| 3 | 181.9290 | 10.8581 | 1.433870 | 95.1 |
| 4 | −126.0676 | 0.1200 | | |
| 5 | 262.0477 | 7.7906 | 1.433870 | 95.1 |
| 6 | −170.4651 | 5.7134 | | |
| 7 | 157.6971 | 6.4670 | 1.433870 | 95.1 |
| 8 | −504.0866 | 0.1200 | | |
| 9 | 88.6569 | 8.7039 | 1.433870 | 95.1 |
| 10 | −565.4884 | 0.1200 | | |
| 11 | 47.8171 | 5.3902 | 1.788330 | 48.9 |
| 12 | 78.0523 | move 1 | | |
| 13 | 38.4838 | 0.8000 | 2.003300 | 28.3 |
| 14 | 12.2575 | 4.2585 | | |
| 15 | −305.3668 | 0.8000 | 1.878920 | 26.3 |
| 16 | 29.6063 | 1.6513 | | |
| 17 | −127.5943 | 6.2611 | 1.808090 | 22.8 |
| 18 | −10.1536 | 0.8150 | 1.829933 | 45.0 |
| 19 | −1008.6654 | 0.1387 | | |
| 20 | 28.4129 | 3.6052 | 1.654494 | 33.3 |
| 21 | −61.4176 | 0.4410 | | |
| 22 | −36.6769 | 0.8001 | 1.878491 | 33.3 |
| 23 | −205.6233 | move 2 | | |
| 24 | −27.8551 | 2.8359 | 1.846660 | 23.8 |
| 25 | −16.8733 | 0.8000 | 1.861635 | 41.8 |
| 26 | −94.3468 | move 3 | | |
| 27 | ∞ (aperture stop) | 1.6109 | | |
| 28 | 7657.3858 | 3.6775 | 1.783843 | 49.0 |
| 29 | −43.0918 | 0.1235 | | |
| 30 | 67.9648 | 6.3456 | 1.496570 | 57.4 |
| 31 | −31.7117 | 1.2038 | 1.865941 | 39.9 |
| 32 | −81.0165 | 35.9139 | | |
| 33 | 106.8516 | 5.0108 | 1.572055 | 47.2 |
| 34 | −45.3887 | 0.1898 | | |
| 35 | 38.2592 | 6.5166 | 1.487490 | 70.2 |

TABLE 6-continued

Example 2 Basic lens data (x1)

| Si (Surface number) | Ri (Radius of curvature) | Di (Surface interval) | Ndj (Refractive index) | νdj (Abbe number) |
|---|---|---|---|---|
| 36 | −38.3390 | 1.2099 | 1.878766 | 35.3 |
| 37 | 35.4446 | 1.2360 | | |
| 38 | 38.3320 | 7.9829 | 1.497000 | 81.6 |
| 39 | −20.6119 | 1.8035 | 1.856440 | 42.3 |
| 40 | −155.7192 | 1.2267 | | |
| 41 | 104.8529 | 5.3750 | 1.578266 | 44.7 |
| 42 | −32.6611 | 0.0000 | | |
| 43 | 0.0000 | 33.0000 | 1.608590 | 46.5 |
| 44 | 0.0000 | 13.2000 | 1.516330 | 64.1 |
| 45 | 0.0000 | | | |
| 46 | 0.0000 | | | |

TABLE 7

Example 2 Basic lens data (x2)

| Si (Surface number) | Ri (Radius of curvature) | Di (Surface interval) | Ndj (Refractive index) | νdj (Abbe number) |
|---|---|---|---|---|
| 28 | 7657.3858 | 3.6775 | 1.783843 | 49.0 |
| 29 | −43.0918 | 0.1235 | | |
| 30 | 67.9648 | 6.3456 | 1.496570 | 57.4 |
| 31 | −31.7117 | 1.2038 | 1.865941 | 39.9 |
| 32 | −81.0165 | 2.6392 | | |
| 101 | 55.0235 | 3.7057 | 1.438750 | 94.9 |
| 102 | −415.2438 | 0.1500 | | |
| 103 | 34.0195 | 4.9667 | 1.438750 | 94.9 |
| 104 | −103.3680 | 0.1500 | | |
| 105 | 36.3606 | 4.1699 | 1.729160 | 54.7 |
| 106 | −82.3974 | 0.8000 | 1.846660 | 23.8 |
| 107 | 44.3644 | 7.8915 | | |
| 108 | −75.0651 | 0.8000 | 1.834810 | 42.7 |
| 109 | 10.2634 | 3.0512 | 1.846660 | 23.9 |
| 110 | 20.9848 | | | |

TABLE 8

Example 2 Data relating to zoom (x1)

| Specifications | Wide-angle end | Telephoto end |
|---|---|---|
| f | 8.03 | 116.38 |
| Fno. | 1.85 | 2.21 |
| 2ω | 73.0 | 5.4 |
| Move 1 | 0.7590 | 40.2254 |
| Move 2 | 45.1408 | 7.9849 |
| Move 3 | 4.3541 | 2.0436 |

TABLE 9

Example 2 Data relating to zoom (x2)

| Specifications | Wide-angle end | Telephoto end |
|---|---|---|
| f | 15.48 | 224.53 |
| Fno. | 3.70 | 4.27 |
| 2ω | 40.0 | 2.8 |

TABLE 10

Example 2 Amount of movement of lens groups

| Distance | Lens group | Wide-angle end | Telephoto end |
|---|---|---|---|
| ∞ to 0.6 m | G12 | 5.293 | 5.293 |
| 0.6 to 0.5 m | G3 | 0.020 | 3.379 |

TABLE 11

Example 3 Basic lens data (x1)

| Si (Surface number) | Ri (Radius of curvature) | Di (Surface interval) | Ndj (Refractive index) | vdj (Abbe number) |
|---|---|---|---|---|
| 1 | −123.9076 | 1.8500 | 1.806100 | 33.3 |
| 2 | 150.0014 | 4.8980 | | |
| 3 | 182.6350 | 10.8721 | 1.433870 | 95.1 |
| 4 | −123.8215 | 0.1200 | | |
| 5 | 258.5569 | 7.8074 | 1.433870 | 95.1 |
| 6 | −170.5678 | 5.7268 | | |
| 7 | 156.2859 | 6.4854 | 1.433870 | 95.1 |
| 8 | −497.2519 | 0.1201 | | |
| 9 | 88.1020 | 8.7244 | 1.433870 | 95.1 |
| 10 | −578.8437 | 0.1202 | | |
| 11 | 47.8613 | 5.4205 | 1.772504 | 50.7 |
| 12 | 78.5864 | move 1 | | |
| 13 | 38.4768 | 0.8004 | 2.003300 | 28.3 |
| 14 | 12.2625 | 4.2471 | | |
| 15 | −319.4197 | 0.8002 | 1.883000 | 40.8 |
| 16 | 29.7403 | 1.6400 | | |
| 17 | −127.8342 | 6.2462 | 1.808090 | 22.8 |
| 18 | −10.1682 | 0.8075 | 1.829940 | 42.0 |
| 19 | −896.7254 | 0.1343 | | |
| 20 | 28.3453 | 3.5921 | 1.644409 | 36.9 |
| 21 | −61.2359 | 0.4356 | | |
| 22 | −36.6707 | 0.8001 | 1.879999 | 32.0 |
| 23 | −203.2945 | move 2 | | |
| 24 | −27.8161 | 2.8219 | 1.846660 | 23.8 |
| 25 | −16.8312 | 0.8000 | 1.854939 | 42.5 |
| 26 | −95.6171 | move 3 | | |
| 27 | ∞ (aperture stop) | 1.6109 | | |
| 28 | 7689.9382 | 3.6775 | 1.781506 | 49.0 |
| 29 | −43.0969 | 0.1235 | | |
| 30 | 67.9689 | 6.3456 | 1.495694 | 57.5 |
| 31 | −31.7138 | 1.2039 | 1.862349 | 40.6 |
| 32 | −81.0226 | 35.9140 | | |
| 33 | 106.8593 | 5.0108 | 1.572300 | 47.1 |
| 34 | −45.3772 | 0.1899 | | |
| 35 | 38.2663 | 6.5167 | 1.487490 | 70.2 |
| 36 | −38.3431 | 1.2100 | 1.880000 | 35.1 |
| 37 | 35.4401 | 1.2360 | | |
| 38 | 38.3349 | 7.9829 | 1.497000 | 81.6 |
| 39 | −20.6130 | 1.8035 | 1.855406 | 42.1 |
| 40 | −155.7593 | 1.2267 | | |
| 41 | 104.8678 | 5.3750 | 1.577832 | 44.9 |
| 42 | −32.6581 | 0.0000 | | |
| 43 | 0.0000 | 33.0000 | 1.608590 | 46.5 |
| 44 | 0.0000 | 13.2000 | 1.516330 | 64.1 |
| 45 | 0.0000 | | | |
| 46 | 0.0000 | | | |

TABLE 12

Example 3 Basic lens data (x2)

| Si (Surface number) | Ri (Radius of curvature) | Di (Surface interval) | Ndj (Refractive index) | vdj (Abbe number) |
|---|---|---|---|---|
| 28 | 7689.9382 | 3.6775 | 1.781506 | 49.0 |
| 29 | −43.0969 | 0.1235 | | |
| 30 | 67.9689 | 6.3456 | 1.495694 | 57.5 |
| 31 | −31.7138 | 1.2039 | 1.862349 | 40.6 |
| 32 | −81.0226 | 2.6373 | | |

TABLE 12-continued

Example 3 Basic lens data (x2)

| Si (Surface number) | Ri (Radius of curvature) | Di (Surface interval) | Ndj (Refractive index) | vdj (Abbe number) |
|---|---|---|---|---|
| 101 | 55.4448 | 3.4927 | 1.438750 | 94.9 |
| 102 | −372.2234 | 0.1500 | | |
| 103 | 34.9943 | 4.8610 | 1.438750 | 94.9 |
| 104 | −104.8632 | 0.1500 | | |
| 105 | 36.1143 | 4.2633 | 1.729160 | 54.7 |
| 106 | −76.3088 | 0.8000 | 1.846660 | 23.8 |
| 107 | 43.4861 | 8.0877 | | |
| 108 | −81.1124 | 0.8000 | 1.834810 | 42.7 |
| 109 | 10.1067 | 3.1389 | 1.846660 | 23.9 |
| 110 | 21.0221 | | | |

TABLE 13

Example 3 Data relating to zoom (x1)

| Specifications | Wide-angle end | Telephoto end |
|---|---|---|
| f | 8.02 | 116.34 |
| Fno. | 1.85 | 2.21 |
| 2ω | 73.2 | 5.4 |
| Move 1 | 0.7597 | 40.2784 |
| Move 2 | 45.1354 | 7.7767 |
| Move 3 | 4.3345 | 2.1746 |

TABLE 14

Example 3 Data relating to zoom (x2)

| Specifications | Wide-angle end | Telephoto end |
|---|---|---|
| f | 15.48 | 224.48 |
| Fno. | 3.70 | 4.27 |
| 2ω | 40.0 | 2.8 |

TABLE 15

Example 3 Amount of movement of lens groups

| Distance | Lens group | Wide-angle end | Telephoto end |
|---|---|---|---|
| ∞ to 0.6 m | G12 | 5.306 | 5.306 |
| 0.6 to 0.5 m | G3 | 0.020 | 3.405 |

TABLE 16

Example 4 Basic lens data (x1)

| Si (Surface number) | Ri (Radius of curvature) | Di (Surface interval) | Ndj (Refractive index) | vdj (Abbe number) |
|---|---|---|---|---|
| 1 | −124.7699 | 1.8500 | 1.806100 | 33.3 |
| 2 | 147.9693 | 4.8984 | | |
| 3 | 179.2160 | 10.8768 | 1.433870 | 95.1 |
| 4 | −125.2868 | 0.1200 | | |
| 5 | 259.1052 | 7.8096 | 1.433870 | 95.1 |
| 6 | −170.2437 | 5.7212 | | |
| 7 | 156.1115 | 6.4893 | 1.433870 | 95.1 |
| 8 | −497.5854 | 0.1200 | | |
| 9 | 88.1726 | 8.7286 | 1.433870 | 95.1 |
| 10 | −572.9721 | 0.1200 | | |
| 11 | 47.8094 | 5.4337 | 1.772737 | 50.7 |
| 12 | 78.5695 | move 1 | | |
| 13 | 38.5322 | 0.8000 | 2.003300 | 28.3 |
| 14 | 12.2525 | 4.2403 | | |

TABLE 16-continued

Example 4 Basic lens data (x1)

| Si (Surface number) | Ri (Radius of curvature) | Di (Surfac interval) | Ndj (Refractive index) | vdj (Abbe number) |
|---|---|---|---|---|
| 15 | −328.5967 | 0.8001 | 1.883000 | 40.8 |
| 16 | 29.8481 | 1.6414 | | |
| 17 | −128.1238 | 6.2428 | 1.808090 | 22.8 |
| 18 | −10.1726 | 0.8104 | 1.829948 | 39.7 |
| 19 | −825.0467 | 0.1427 | | |
| 20 | 28.2162 | 3.5963 | 1.641078 | 38.8 |
| 21 | −61.2116 | 0.4360 | | |
| 22 | −36.6551 | 0.8003 | 1.883000 | 40.8 |
| 23 | −199.1370 | move 2 | | |
| 24 | −27.7640 | 2.8143 | 1.846660 | 23.8 |
| 25 | −16.7619 | 0.800 | 1.845236 | 43.5 |
| 26 | −96.8860 | move 3 | | |
| 27 | ∞ (aperture stop) | 1.6109 | | |
| 28 | 7736.4098 | 3.6775 | 1.776245 | 49.2 |
| 29 | −43.1068 | 0.1235 | | |
| 30 | 67.9694 | 6.3457 | 1.492029 | 58.0 |
| 31 | −31.7153 | 1.2039 | 1.860833 | 41.0 |
| 32 | −81.0356 | 35.9140 | | |
| 33 | 106.8689 | 5.0109 | 1.572846 | 47.1 |
| 34 | −45.3576 | 0.1900 | | |
| 35 | 38.2776 | 6.5168 | 1.487490 | 70.2 |
| 36 | −38.3504 | 1.2100 | 1.880000 | 34.8 |
| 37 | 35.4324 | 1.2361 | | |
| 38 | 38.3401 | 7.9830 | 1.497000 | 81.6 |
| 39 | −20.6149 | 1.8036 | 1.851077 | 42.4 |
| 40 | −155.8249 | 1.2267 | | |
| 41 | 104.9070 | 5.3751 | 1.575839 | 45.3 |
| 42 | −32.6540 | 0.0000 | | |
| 43 | 0.0000 | 33.0000 | 1.608590 | 46.5 |
| 44 | 0.0000 | 13.2000 | 1.516330 | 64.1 |
| 45 | 0.0000 | | | |
| 46 | 0.0000 | | | |

TABLE 17

Example 4 Basic lens data (x2)

| Si (Surface number) | Ri (Radius of curvature) | Di (Surface interval) | Ndj (Refractive index) | vdj (Abbe number) |
|---|---|---|---|---|
| 28 | 7736.4098 | 3.6775 | 1.776245 | 49.2 |
| 29 | −43.1068 | 0.1235 | | |
| 30 | 67.9694 | 6.3457 | 1.492029 | 58.0 |
| 31 | −31.7153 | 1.2039 | 1.860833 | 41.0 |
| 32 | −81.0356 | 2.6386 | | |
| 101 | 55.3446 | 3.2883 | 1.438750 | 94.9 |
| 102 | −411.1422 | 0.1500 | | |
| 103 | 35.7242 | 4.8326 | 1.438750 | 94.9 |
| 104 | −100.9877 | 0.1500 | | |
| 105 | 36.5588 | 4.3358 | 1.729160 | 54.7 |
| 106 | −69.5547 | 0.8000 | 1.846660 | 23.8 |
| 107 | 44.4033 | 8.2173 | | |
| 108 | −83.4298 | 0.8000 | 1.834810 | 42.7 |
| 109 | 10.0528 | 3.1784 | 1.846660 | 23.9 |
| 110 | 21.1438 | | | |

TABLE 18

Example 4 Data relating to zoom (x1)

| Specifications | Wide-angle end | Telephoto end |
|---|---|---|
| f | 8.02 | 116.35 |
| Fno. | 1.85 | 2.21 |
| 2ω | 73.0 | 5.4 |
| Move 1 | 0.7579 | 40.2607 |
| Move 2 | 45.1320 | 7.9092 |
| Move 3 | 4.3174 | 2.0375 |

TABLE 19

Example 4 Data relating to zoom (x2)

| Specifications | Wide-angle end | Telephoto end |
|---|---|---|
| f | 15.48 | 224.49 |
| Fno. | 3.70 | 4.27 |
| 2ω | 40.0 | 2.8 |

TABLE 20

Example 4 Amount of movement of lens groups

| Distance | Lens group | Wide-angle end | Telephoto end |
|---|---|---|---|
| ∞ to 0.6 m | G12 | 5.302 | 5.302 |
| 0.6 to 0.5 m | G3 | 0.021 | 3.485 |

Table 21 shows values corresponding to the conditional expressions (1) and (2) for the zoom lenses of Examples 1 to 4. The values shown in Table 21 are with respect to the d-line.

TABLE 21

Values relating to conditional expressions

| | Example 1 | Example 2 | Example 3 | Example 4 |
|---|---|---|---|---|
| f3 | −46.520 | −46.206 | −46.564 | −47.256 |
| (1) f3/ft | −0.400 | −0.397 | −0.400 | −0.406 |
| (2) k3/ft | 0.030 | 0.029 | 0.029 | 0.030 |

FIG. 9 shows, at A to C, spherical aberration, astigmatism and distortion of the zoom lens of Example 1 at the wide-angle end when the fourth-group third lens sub-group G43 is not inserted, and shows, at D to F, spherical aberration, astigmatism and distortion of the zoom lens of Example 1 at the telephoto end when the fourth-group third lens sub-group G43 is not inserted.

FIG. 10 shows, at A to C, spherical aberration, astigmatism and distortion of the zoom lens of Example 1 at the wide-angle end when the fourth-group third lens sub-group G43 is inserted, and shows, at D to F, spherical aberration, astigmatism and distortion of the zoom lens of Example 1 at the telephoto end when the fourth-group third lens sub-group G43 is inserted.

These aberration diagrams are with respect to the d-line (the wavelength of 587.6 nm). In each astigmatism diagram, an aberration in the sagittal direction is shown in the solid line and an aberration in the tangential direction is shown in the dashed line. The "Fno." in each spherical aberration diagram means the f value. The symbol "ω" in the other aberration diagrams means the half angle of field.

Similarly, FIG. 11 shows, at A to F, the similar aberration diagrams of Example 2 at the wide-angle end and at the telephoto end when the fourth-group third lens sub-group G43 is not inserted, and FIG. 12 shows, at A to F, the similar aberration diagrams of Example 2 at the wide-angle end and at the telephoto end when the fourth-group third lens sub-group G43 is inserted. The similar aberration diagrams of Examples 3 and 4 are shown in FIGS. 13 to 16.

Figure 17:
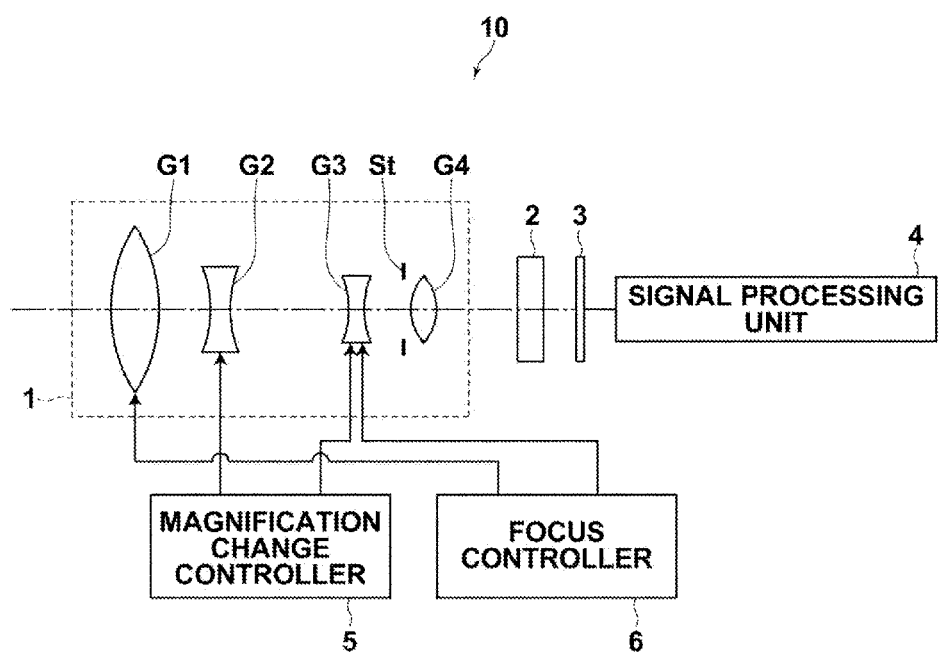
FIG. 17 is a diagram illustrating the schematic configuration of an imaging apparatus according to an embodiment of the invention.

Next, an imaging apparatus according to an embodiment of the invention is described. FIG. 17 is a diagram illustrating the schematic configuration of an imaging apparatus 10, which employs the zoom lens 1 of the embodiment of the invention, as one example of the imaging apparatus of the embodiment of the invention. The imaging apparatus may, for example, be a monitoring camera, a video camera, an electronic still camera, or the like.

The imaging apparatus 10 shown in FIG. 17 includes the zoom lens 1, a filter 2 disposed on the image side of the zoom lens 1, an image sensor 3 for capturing an image of a subject formed by the zoom lens 1, a signal processing unit 4 for processing an output signal from the image sensor 3, a magnification change controller 5 for performing the magnification change of the zoom lens 1, and a focus controller 6 for controlling the focus.

The zoom lens 1 has the configuration of Example 1, for example, and includes the first lens group G1 having a positive refractive power, the second lens group G2 having a negative refractive power, the third lens group G3 having a negative refractive power, and the fourth lens group G4 having a positive refractive power. Magnification change and focusing of the zoom lens 1 are achieved in the above-described manners. In FIG. 17, the lens groups are schematically shown. It should be noted that a mechanism for removably inserting the fourth-group third lens sub-group G43 is omitted in FIG. 17. As this mechanism, a conventionally known mechanism can be used.

The image sensor 3 captures an optical image formed by the zoom lens 1 and outputs an electronic signal. The imaging plane of the image sensor 3 is positioned to coincide with the image plane of the zoom lens 1. As the image sensor 3, a CCD, a CMOS, or the like, may be used, for example.

The imaging apparatus 10 that is provided with the zoom lens 1 according to the invention can sufficiently image an object at a close distance, and can be made compact and light weight.

The present invention has been described with reference to the embodiments and examples. However, the invention is not limited to the above-described embodiments and examples, and various modifications may be made to the invention. For example, the values of the radius of curvature, the surface interval, the refractive index, the Abbe number, the aspherical coefficients, etc., of each lens component are not limited to the values shown in the above-described numerical examples and may take different values.

What is claimed is:

1. A zoom lens substantially consisting of, in order from an object side:
   a first lens group that has a positive refractive power and is fixed during magnification change, wherein the first lens group substantially consists of, in order from the object side, a first-group first lens sub-group and a first-group second lens sub-group;
   a second lens group that has a negative refractive power and is moved along an optical axis during magnification change;
   a third lens group that has a negative refractive power and corrects for fluctuation of an image plane along with magnification change; and
   a fourth lens group that has a positive refractive power and is fixed during magnification change,
   wherein focusing of an object at a distance between infinity and a predetermined distance is achieved by moving the first-group second lens sub-group along the optical axis,
   focusing of an object at a closer distance than the predetermined distance is achieved by moving the third lens group along the optical axis, and
   the conditional expressions below are satisfied:

$$-0.8 < f3/ft < -0.2 \tag{1}$$

and $$0.01 < k3/ft < 0.08 \tag{2},$$

where f3 is a focal length of the third lens group, ft is a focal length of the entire system at a telephoto end, and k3 is an amount of movement of the third lens group to achieve focusing in the range between the predetermined distance and a minimum object distance at the telephoto end.

2. A zoom lens substantially consisting of, in order from object side:
   a first lens group that has a positive refractive power and is fixed during magnification change;
   a second lens group that has a negative refractive power and is moved along an optical axis during magnification change;
   a third lens group that has a negative refractive power and corrects for fluctuation of an image plane along with magnification change; and
   a fourth lens group that has a positive refractive power and is fixed during magnification change, wherein the fourth lens group substantially consists of:
   a fourth-group first lens sub-group that has a positive refractive power;
   a fourth-group second lens sub-group that is disposed on an image side of the fourth-group first lens sub-group and has a positive refractive power; and
   a fourth-group third lens sub-group that is removably insertable between the fourth-group second lens sub-group and the fourth-group first lens sub-group,
   wherein when the fourth-group third lens sub-group is inserted, a focal length of the entire zoom lens is shifted toward a long-focus side,
   wherein focusing of an object at a distance between infinity and a predetermined distance is achieved by moving the entire first lens group or a part of the first lens group along the optical axis,
   focusing of an object at a closer distance than the predetermined distance is achieved by moving the third lens group along the optical axis, and
   the conditional expressions below are satisfied:

$$-0.8 < f3/ft < -0.2 \tag{1}$$

and $$0.01 < k3/ft < 0.08 \tag{2},$$

where f3 is a focal length of the third lens group, ft is a focal length of the entire system at a telephoto end, and k3 is an amount of movement of the third lens group to achieve focusing in the range between the predetermined distance and a minimum object distance at the telephoto end.

3. An imaging apparatus comprising the zoom lens as claimed in claim 1.

* * * * *